US010333344B2

(12) United States Patent
Luk

(10) Patent No.: US 10,333,344 B2
(45) Date of Patent: Jun. 25, 2019

(54) EMERGENCY BACKUP SYSTEMS PROVIDING DIMMED POWER

(71) Applicant: DeNovo Lighting LLC, Flushing, NY (US)

(72) Inventor: John F. Luk, Flushing, NY (US)

(73) Assignee: DeNovo Lighting LLC, Flushing, NY (US)

( * ) Notice: Subject to any disclaimer, the term of this patent is extended or adjusted under 35 U.S.C. 154(b) by 225 days.

(21) Appl. No.: 15/437,909

(22) Filed: Feb. 21, 2017

(65) Prior Publication Data

US 2017/0244278 A1 Aug. 24, 2017

Related U.S. Application Data

(60) Provisional application No. 62/297,936, filed on Feb. 21, 2016.

(51) Int. Cl.
| | |
|---|---|
| *H02J 7/02* | (2016.01) |
| *H02J 9/06* | (2006.01) |
| *H05B 33/08* | (2006.01) |
| *F21Y 115/10* | (2016.01) |
| *F21S 9/02* | (2006.01) |

(52) U.S. Cl.
CPC ............... *H02J 9/065* (2013.01); *H02J 7/02* (2013.01); *H05B 33/0815* (2013.01); *H05B 33/0845* (2013.01); *F21S 9/022* (2013.01); *F21Y 2115/10* (2016.08)

(58) Field of Classification Search
None
See application file for complete search history.

(56) References Cited

U.S. PATENT DOCUMENTS

| 6,045,232 A | 4/2000 | Buckmaster | |
|---|---|---|---|
| 9,560,703 B2 | 1/2017 | Trainor et al. | |
| 2012/0074843 A1* | 3/2012 | Recker | H05B 33/0815 315/86 |
| 2012/0187852 A1* | 7/2012 | Mandy | H02J 9/06 315/175 |
| 2015/0097484 A1* | 4/2015 | Lee | H05B 33/0848 315/85 |

(Continued)

OTHER PUBLICATIONS

Specification Sheet for Fulham Co. product FHSAC1-UNV-40L (3 pages).

(Continued)

*Primary Examiner* — Jared Fureman
*Assistant Examiner* — Aqeel H Bukhari
(74) *Attorney, Agent, or Firm* — Fox Rothschild LLP; Carol E. Thorstad-Forsyth

(57) ABSTRACT

A dimmer device for connection to a conventional uninterruptible power supply (UPS) may include a dimmer and a switch assembly that can be configured to provide an automatically switched dimming output to LED loads during a power failure. An integrated emergency backup system may include a charging circuit, a battery, an inverter, a dimmer and a switch circuit that provides an automatically switched dimming output to LED loads during a power failure. The system may operate in either phase dimming mode or 0-10 v low voltage dimming mode. A lighting fixture that includes a light fixture with built-in emergency backup system is also disclosed.

28 Claims, 15 Drawing Sheets

(56) References Cited

U.S. PATENT DOCUMENTS

2015/0115828 A1\* 4/2015 Cha .................. H05B 33/0845
 315/224
2017/0033598 A1 2/2017 Shen et al.

OTHER PUBLICATIONS

Specification Sheet for Fulham Co. product FHSAC1-UNV-40C (3 pages).
Specification Sheet for Fulham Co. product FHSAC1-UNV-40BLS (3 pages).
Specification Sheet for Philips bodine Emergency Backup Inverter ELI-S-100 (2 pages).
Specification Sheet for IOTA Engineering Micro Inverter IIS-35-I (2 pages).

\* cited by examiner

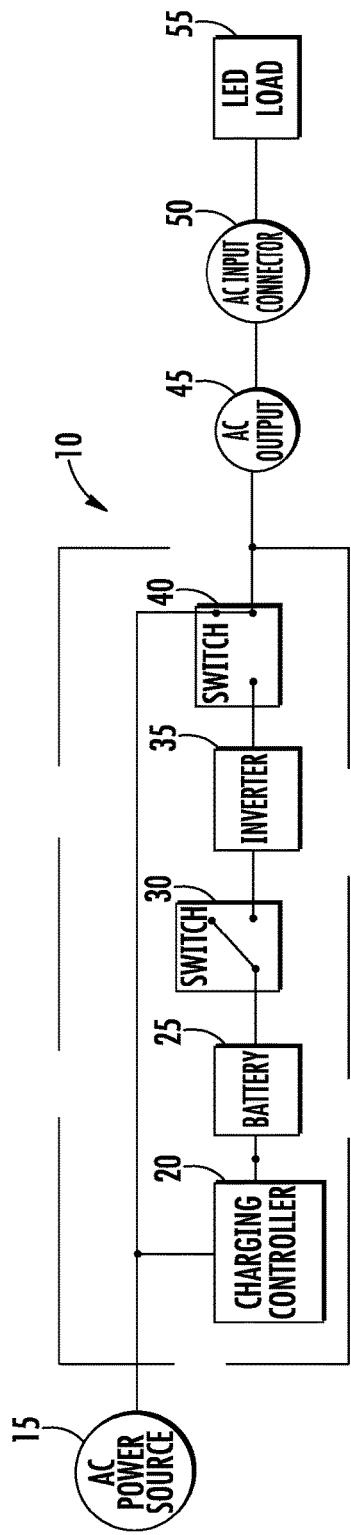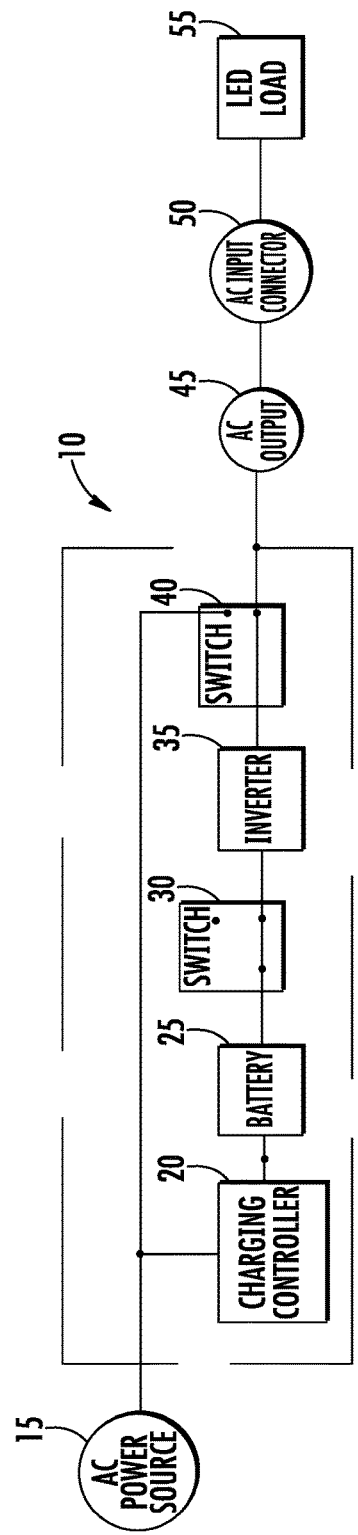
FIG. 1A
PRIOR ART
FIG. 1B
PRIOR ART

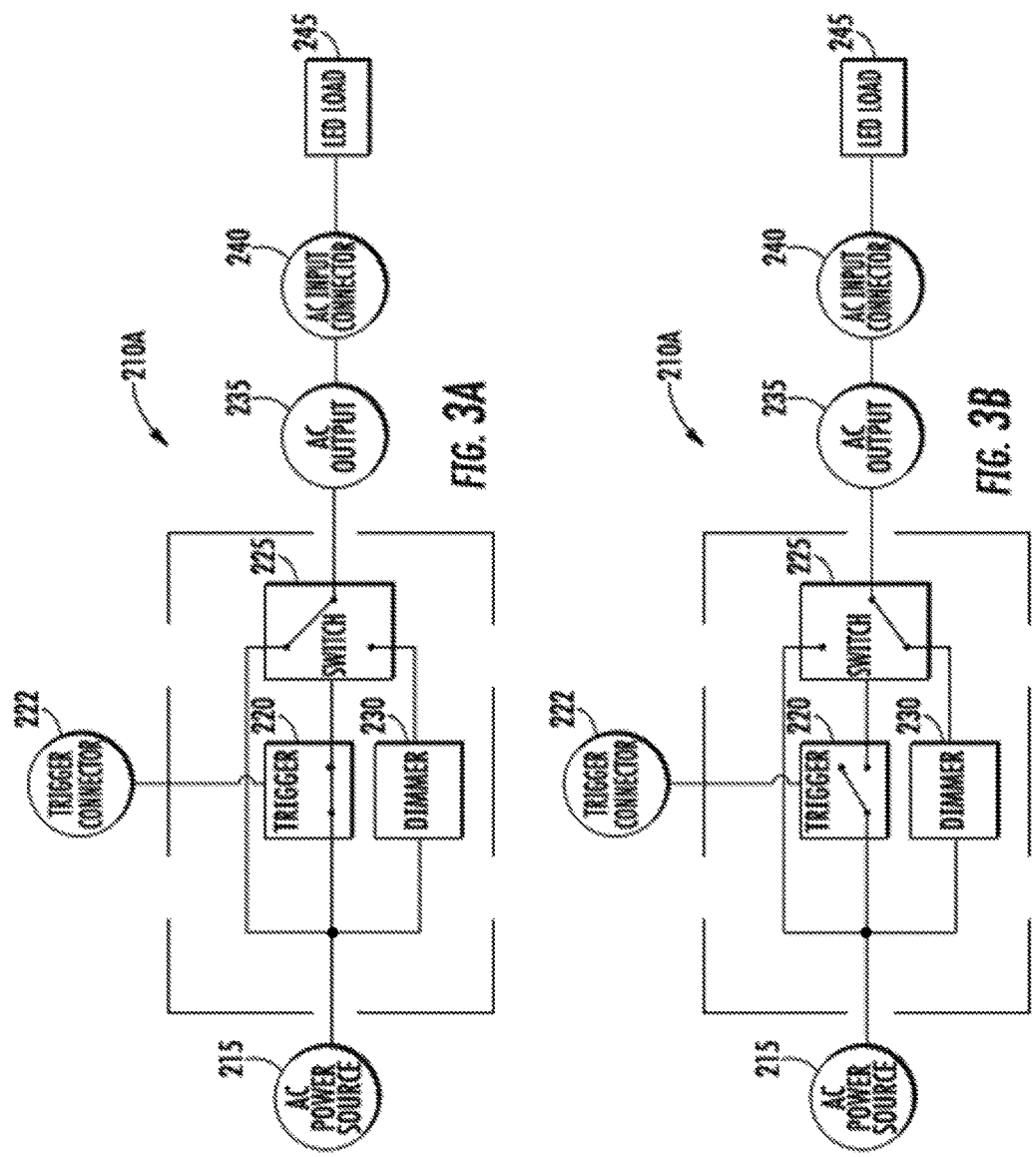

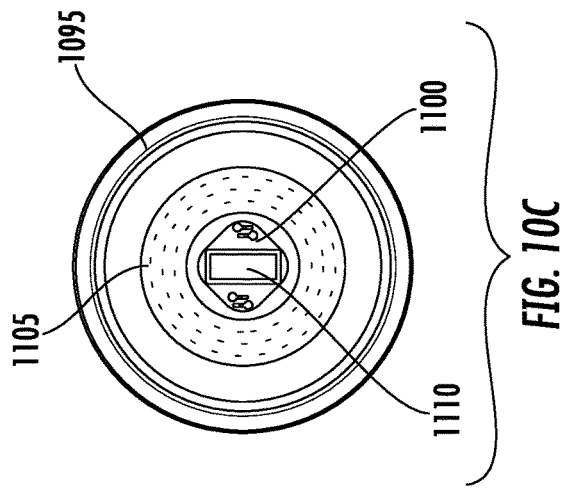
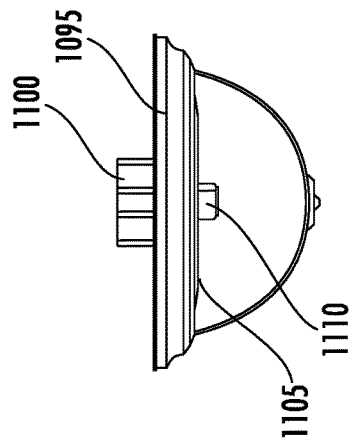
FIG. 10C
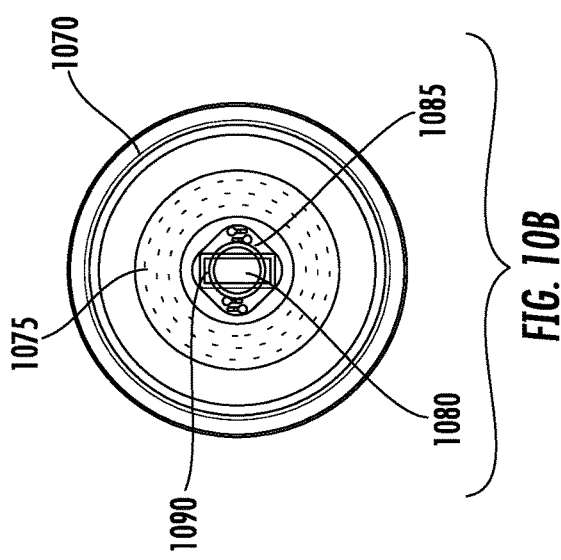
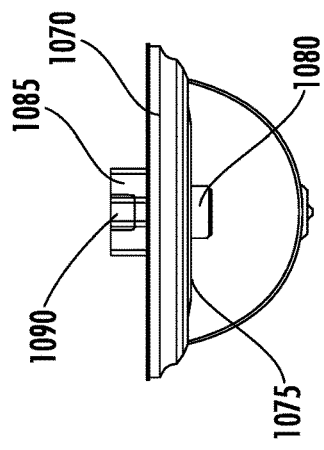
FIG. 10B
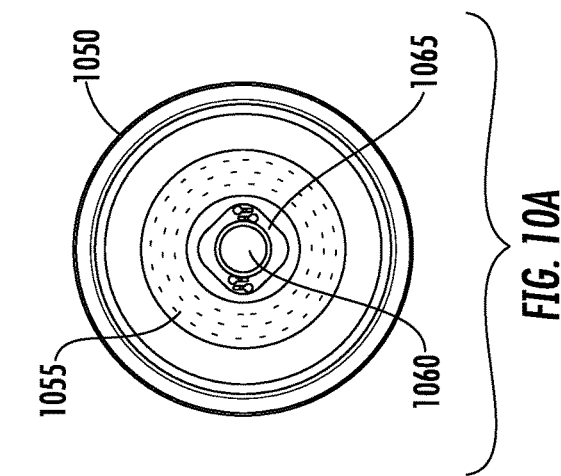
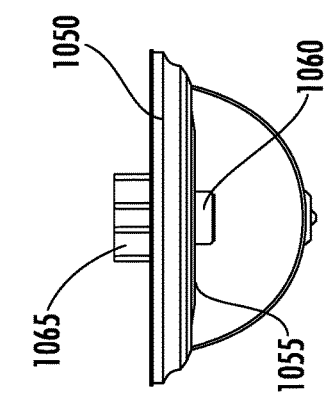
FIG. 10A

EMERGENCY BACKUP SYSTEMS PROVIDING DIMMED POWER

RELATED APPLICATIONS

This application claims the benefit of priority of U.S. Provisional Patent Application No. 62/297,936, filed Feb. 21, 2016, the disclosure of which is incorporated herein by reference in its entirety.

BACKGROUND

This disclosure relates to emergency backup devices and systems and in particular to emergency backup device for light-emitting diode (LED) loads.

Conventional direct current (DC) LED boards with external alternating current (AC) LED drivers are becoming increasingly less desirable for reliability and long term use, at least within some lighting applications. More recently, AC driver-on-board (DOB) LED modules with on-board electronics are becoming more popular as the LED light source of choice. AC DOB LED modules can be commercially available, such as those manufactured by Seoul Semiconductor, Luxtech, Lynk Labs, and III-N Technology with many Asian companies.

Unlike external LED drivers that use electrolytic capacitors and that may fail at, for example 20,000 hours, the AC DOB LED modules use solid states electronics that can last up much longer, for example 100,000 hours. The AC LED modules are compact and low profile in design, and can be used with dimmers and direct mains line voltage such as 120 vac, 220 vac, or 277 vac power, which can be readily available to power lighting in the United States and Canada, and around the world.

With power failures, rolling black-outs, brown-outs, over/under input voltage conditions, and unforeseen power outages, there becomes a need for inexpensive and affordable emergency backup power devices to work with these AC LED modules. These emergency backup devices need to be small, compact, and cost-effective to work with the new AC driver-on-board (DOB) LED light engines and AC LED modules used in luminaires to provide adequate emergency lighting for the safe egress of persons from a building, office, apartment, school, store, or other establishment quickly and efficiently.

Conventional backup power systems for AC devices include uninterruptible power supplies (or UPS). A uninterruptible power supply, also uninterruptible power source, UPS, or battery/flywheel backup is an electrical apparatus that provides emergency power to a load when the input power source, typically mains power, fails. The on-battery runtime of most uninterruptible power sources is relatively short at only a few minutes, but is sufficient to start a standby power source or to properly shutdown the protected equipment.

Inverter battery backup systems are also commonly used in emergency lighting today. Inverter systems are primarily designed for higher power applications to provide full power 120 vac to multiple fixtures. The drawback here besides the expensive cost of these systems is that they require larger and heavier batteries to operate and to provide the emergency backup capacity during a power failure condition.

Modern UPS systems may have three categories: on-line, line-interactive, and off-line standby. An on-line UPS system uses a "double-conversion" method of accepting AC input, rectifying to DC for passing through the rechargeable battery or battery strings, then inverting it back to 120 vac/230 vac for powering the protected equipment. A line-interactive UPS maintains the inverter in line and redirects the battery's DC current path from the normal charging mode to supplying current when the power is lost. In an off-line standby system, the load is powered directly by the input power and the backup power circuitry is only invoked when the utility power fails. Most UPS system below 1 kVA are of the line-interactive or of the off-line standby variety, which are usually less expensive.

For an off-line standby UPS, the typical protection time is 0-20 minutes of backup capacity, which is usually not expandable. In a line-interactive UPS, the typical protection time is 5-30 minutes of backup capacity. The line-interactive UPS can be expanded to several hours of backup capacity, but it will be very costly. Power from the present UPS is generally at full maximum output, so the load, such as LED load or AC LED module will be at full brightness and drawing the maximum amount of energy even during a blackout. It then becomes apparent that the main drawback for an inexpensive and affordable UPS system for use with AC LED modules is the limited backup time to power the light from the AC LED module during an emergency AC power failure condition.

The primary codes used to determine proper application of emergency lighting systems include: International Building Code (IBC), NFPA 101: Life Safety Code, NFPA 70: National Electrical Code, NFPA 110: Standard for Emergency and Standby Power Systems, NFPA 111: Standard on Stored Electrical Energy Emergency and Standby Power Systems, and NFPA 99: Health Care Facilities Code. Among these codes, OSHA 29CFR and NFPA 101 outline the basic requirements for emergency lighting as follows: (a) emergency lighting must last for at least 1.5 hours or 90 minutes after power failure; (b) emergency lighting must emit 1.0 foot-candles (10.8 lux) of light at any point in the building and 0.1 foot-candles of light along the emergency exit path at floor level; (c) after the emergency illumination period of at least 1.5 hours or 90 minutes, it is permissible for the illumination to fade to 0.6 foot-candles of light at any point in the building and 0.06 foot-candles of light along the emergency exit path at floor level.

The testing requirements for emergency backup lighting during a loss of AC power include function test and discharge test. Function test may require that: (a) all emergency luminaires should be tested by breaking the supply to them and checking that they operate satisfactorily; (b) the supply must then be restored and the charging indicator must be seen to be operating correctly; and (c) this test must be performed at least once per month and the results logged. Discharge test may require that: (a) the emergency luminaires must be tested for their full rated duration period and checked for satisfactory operation; the supply must then be restored and the charging indicators rechecked; (c) this test must be performed at least annually and the results logged. However, some existing systems may not be able to meet these requirements. Further, there also becomes a need for a small and compact package with sufficient battery backup power.

This document describes systems and methods that are intended to address at least some issues discussed above and/or other issues.

SUMMARY

In some embodiments, an integrated emergency backup system may include an inverter operable to convert a direct current (DC) power to an alternating current (AC) power, a dimmer operable to dim the AC power from the inverter to output a dimmed AC power, a charging circuit and a switch assembly. The dimmer may be an AC phase dimmer. The charging circuit may be operable to deliver a charging voltage from an AC power source received at an input connector to a battery when the AC power source is on, and provide a DC power, directly or indirectly, to the inverter. The switch assembly may be operable to establish different connection paths. When the AC power source is on, the switch assembly may be operable to supply a full power of the AC power source to a load via an output connector. When the AC power source is interrupted, the switch assembly may be operable to supply a DC power from the battery to the inverter and to the dimmer, and output the dimmed AC power from the dimmer to the load via the output connector.

In some embodiments, the charging circuit may include a charging controller connecting between the input connector and an input of the battery, and is operable to deliver the charging voltage from the AC power source to the battery when the AC power source is on. The charging circuit may also include an inverter switch coupling an output of the battery to an input of the inverter, and is operable to connect a path between the battery and the inverter when the AC power source is interrupted and to cause an open circuit between the battery and the inverter when the AC power source is on.

The switch assembly may include a first dimmer switch and a second dimmer switch. The first dimmer switch may couple the dimmer to the output connector, and is operable to connect the dimmer to the output connector or to bypass the dimmer. The second dimmer switch may be operable to trigger the first dimmer switch to bypass the dimmer when the AC power source is on and to connect a path between the dimmer and the output connector when the AC power source is interrupted. The switch assembly may further include a third dimmer switch operable to connect a path between the input connector and the dimmer when the AC power source is on; and to connect a path between the inverter and the dimmer when the AC power source is interrupted.

Alternatively, and/or additionally, the charging circuit may include a power supply unit connecting to the input connector, a charging controller connecting to a battery and is operated to deliver the charging voltage from the AC power source to the battery when the AC power source is on, and a charging switch connected between the power supply unit and the charging controller and is operated to connect the power supply unit to the charging controller when the AC power source is on, and to disconnect the two when the AC power source is interrupted.

Alternatively, and/or additionally, the switch assembly may include a first dimmer switch coupling the dimmer to the output connector and is operated to connect the dimmer to the output connector or to bypass the dimmer. The switch assembly may also include a second dimmer switch connecting to the input connector and the first dimmer switch, and is operated to trigger the first dimmer switch to pass the dimmer when the AC power source is on and to connect the dimmer to the output connector when the AC power source is interrupted.

In some embodiments, the emergency backup system may further include a DC connector, operated to output a DC low voltage for controlling a low voltage dimmer to a LED load, such as a dimmable LED load. The emergency backup system may further include an output switch having a phase dimming mode and a low voltage output dimming mode. In phase dimming mode, the system may be configured to cause the output connector to output the dimmed AC power when the AC power source is interrupted. The system may also additionally be configured to cause the output connector to output a full power of the AC power source when the AC power source is on.

In low voltage output dimming mode, the system may be configured to cause the output connector to output a full power of the AC power source and cause the DC connector to output the DC low voltage when the AC power source is interrupted, and cause the output connector to output a full power of the AC power source when the AC power source is on. In some embodiments, the low voltage output dimming mode is 0-10 v output dimming mode. In some embodiments, the output switch may be a jumper to header pins. The dimmer may be an AC dimmer setting switch operated to preset a dimming level for the dimmer. The system may also include a DC dimmer setting switch operated to preset a dimming level for the DC low voltage ranging between 0 and 9 volts.

In some embodiments, a lighting system may include an integrated emergency backup device described above. The lighting system may additionally include a light-emitting diode (LED) lighting fixture which includes one or more LEDs. The lighting system may also include a dimmable LED load coupled to the LED lighting fixture for providing power to the one or more LEDs, an inverter configured to convert a direct current (DC) power to an alternating current (AC) power, a dimmer configured to dim the AC power from the inverter to output a dimmed AC power a charging circuit and a switch assembly. The charging circuit and the switch assembly may work in a similar manner as those in the emergency backup system described above.

In some embodiments, a LED dimmer apparatus couplable to a uninterrupted power system (UPS) may include a dimmer, a first switch and a trigger device. The dimmer may be positioned to connect to an input connector and operable to dim an alternating current (AC) power from a UPS received at the input connector to output a dimmed AC power to a LED load via an output connector. The UPS is configured to provide the AC power continuously. The first switch may connect to the input connector, the dimmer and the output connector, and is operable either to connect a path between the dimmer and the output connector or to connect a path between the input connector and the output connector bypassing the dimmer. The trigger device may be positioned to connect between the input connector and the first switch. When the PC power is on, the trigger device may be operated to trigger the first switch to connect the path between the input connector and the output connector to provide a full power of the AC power to the LED load. When the AC power is interrupted, the trigger device may be operable to trigger the first switch to connect the path between the dimmer and the output connector to output the dimmed AC power to the LED load.

BRIEF DESCRIPTION OF THE DRAWINGS

FIGS. 1A and 1B illustrate an example of a backup system using a uninterruptible power supply (UPS) and the state of the system at normal AC power and loss of AC power conditions, respectively.

FIGS. 3A, 3B, 4A, 4B, 5A, 5B, 6A, 6B, 7A and 7B illustrate some examples of an emergency backup system and the state of the system at normal AC power and loss of AC power conditions, respectively, according to various embodiments.

FIG. 9A shows a top plan view of the device. FIG. 9B shows a side view of the device.

FIGS. 10A, 10B and 10C illustrate various embodiments of a LED lighting fixture with emergency backup power.

DETAILED DESCRIPTION

Figure 2A:
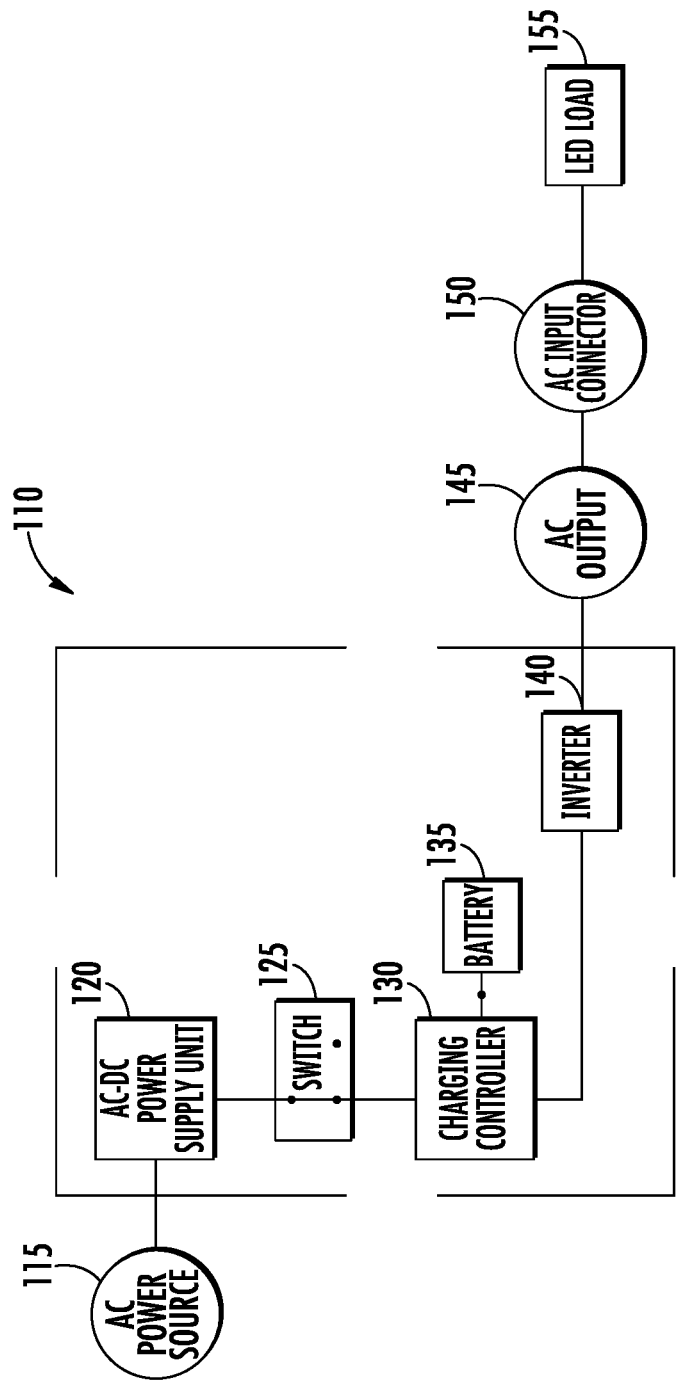
FIGS. 2A and 2B illustrate an example of a backup system using a uninterruptible power supply (UPS) with an AC-DC power supply unit (PSU) and the state of the system at normal AC power and loss of AC power conditions, respectively.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

The term "load" refers to an electronic device drawing current from a power source. Examples of a load may include a lighting device, such as resistive incandescent, halogen, compact fluorescent lights and light-emitting diodes (LEDs). Examples of a load may also include motors, audio devices or other electronic devices.

The term "LED load" refers to a LED driver connected to LEDs, such as conventional AC drivers with DC boards, or AC driver-on-board module with on-board electronics, both of which may be used with direct mains line voltage or dimmers.

The term "dimmer" refers to a device used to lower the power applied to a load, such as lowering the brightness of a light by changing/chopping the voltage waveform or reducing the current of an AC source applied to a load, or lowering the voltage of a DC power source applied to the lighting.

FIGS. 1 and 2 show examples of existing emergency backup systems using uninterruptible power supply (UPS). For example, in FIG. 1A, a UPS system 10 is connected to an active input AC power source 15 and the output 45 is connected to a LED load 55. The UPS system 10 has a charging controller 20 connected to a battery 25, which is connected to an inverter 35 through a switch 30. The inverter 35 is connected to the output 45 via a switch 40. The input AC power source is mains line voltage AC power. During a normal AC power condition, the AC power source provides power to the charging controller 20 and to the battery 25. The switch 40 also connects the AC power source to the AC output 45. The switch 30 disconnects between the battery 25 and the inverter 35. The switch 40 also disconnects from the inverter 35, so that AC power source 15 connects directly to AC output 45. AC power source 15 then flows directly to AC input connector 50 that is connected to the LED load 55, which may be an AC LED module (not shown), or a conventional AC LED driver and DC LED board (not shown).

In FIG. 1B, during a loss of AC power to the UPS system 10, the AC power source 15 is interrupted. The switch 30 connects the battery 25 to the inverter 35 such that the DC power output of battery 25 is connected to the inverter 35, which produces an AC power output, and which is transferred to the AC output 45 by way of switch 40. The switch 40 also disconnects from the AC power source 15, so that the AC output from the inverter 35 flows to the AC output 45 then flows directly to AC input connector 50 and to the LED load 55.

FIG. 2A shows a block diagram of a uninterruptible power supply (UPS) system with a AC-DC power supply unit (PSU). The system 110 includes a PSU 120 connected to an active input AC power source 115. AC power source 115 is mains line voltage AC power (not shown). During a normal AC power condition, switch 125 connects a path between the PSU 120 and a charging controller 130, so that AC power source 115 provides power to the charging controller 130 through PSU 120, and to the battery 135. DC power from PSU 120 is passed to inverter 140, which outputs AC power directly to AC output 145 and to AC input connector 150, which is connected to a LED load 155.

Figure 2B:
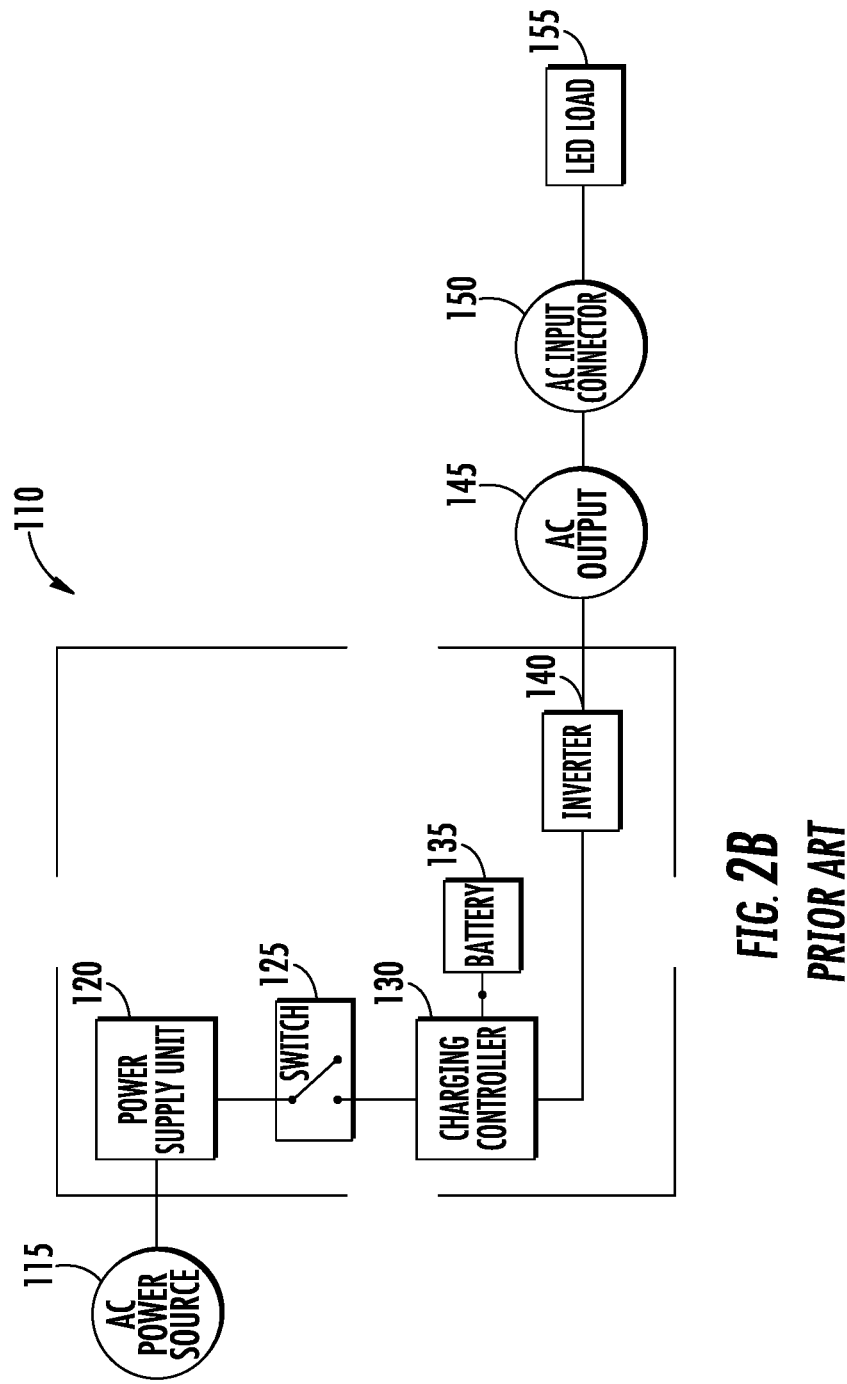

FIG. 2B shows the state of the system 110 in a loss of AC power emergency backup condition. When the AC power source 115 is interrupted, switch 125 disconnects between PSU 120 and the charging controller 130. Battery 135 now supplies DC power from the battery 135 through charging controller 130 to inverter 140. The output of inverter 140 passes AC power from the output of inverter 140 directly to AC output 145 and to AC input connector 150 that is connected to the LED load 155.

As shown in FIGS. 1 and 2, during the loss of AC power source, the system outputs AC backup power produced from the backup battery that provides DC power to an inverter, which produces AC power at full power. This may quickly drain the backup battery, resulting in a undesirable situation and failure of meeting the respective code requirements. Various embodiments of improved emergency backup power systems that meet the code requirements in terms of minimum illuminations and time period as well as providing other advantages, will be described in detail with references to FIGS. 3-10.

In FIG. 3A, according to some embodiments, a LED dimmer apparatus may be couplable to a uninterrupted power supply (UPS) system, which provides AC power source continuously. The UPS system may be any suitable system which can be commercially available. For example, the UPS can be a back-up system that provides a 110 VAC output made by APC. The LED dimmer apparatus 210A may include a dimmer 230. The dimmer 230 may connect to an input connector and operable to dim an alternating current (AC) power source from a UPS received at the input connector 215. The dimmer 230 may also output a dimmed AC power. The dimmer 230 may be coupled to a LED load 245 via an output connector 235. The dimmer apparatus 210A may also include a switch 225 that connects to the input connector 215, the dimmer 230 and the output connector 235. The switch 225 may be operable to either connect a path between the dimmer 230 and the output connector 235 or connect a path between the input connector 215 and the output connector 235, bypassing the dimmer. The dimmer apparatus 210A may also include a trigger 220 for causing the switch 225 to switch to different connecting paths above. When the AC power is on, the trigger 220 can trigger the switch 225 to connect the path between the input connector and the output connector to provide a full power of the AC power to the LED load 245. In FIG. 3B, when the AC power is interrupted, the loss of AC power may cause the trigger 220 to trigger the switch 225 to connect the path between the dimmer 230 and the output connector to output the dimmed AC power to the LED load 245. The operation of the trigger 220 and switch 225 is further explained in detail.

In some embodiment, the trigger can be part of an electromechanical relay or solid state relay that works with AC power. For an electromechanical relay, for example, in the presence of AC power, the inductive coil of the electromechanical relay will energize and cause the mechanical contact switches to close. Likewise, when AC power is interrupted, the springs on the mechanical contact switches will pull them open again. The inductive coil may be energized by AC or DC power depending on the type of electromechanical relay being used. Also, depending on the switch contacts being connected to opposing full output AC power or dimmed AC power, the normally closed or normally open contacts may be used with the common contact. Likewise, a solid state relay may operate in a similar manner, but will use electronic transistors to do the switching.

In some embodiments, the method of monitoring and triggering a secondary switch, such as switch 225 as described above, can be both automatic and passive. For example, the LED dimmer apparatus 210A may also include an active circuit, for example, an on-board microprocessor with input/output (I/O) capability for monitoring the presence or absence of an AC power source. The microprocessor may convert the AC power source to a DC power by an internal power supply unit (PSU), and then automatically trigger the corresponding output switches to provide full output AC power or a dimmed AC power.

In order for the trigger 220 to detect loss of AC power, the LED dimmer apparatus may have a trigger connector 222 connectable to an AC power. In some embodiments, the connector 222 may be connected to the switch 125 of the UPS system 110 in FIG. 2A or 2B. In some embodiments, the switch 125 of the UPS system may be a double pole, single throw (DPST) switch or a double pole, double throw (DPDT) switch. Alternatively, and/or additionally, the connector 222 may also be connected directly to the AC power source. When the AC power source is interrupted, the switch 220 may become part of the relay to control the switch 225.

Figure 4A:
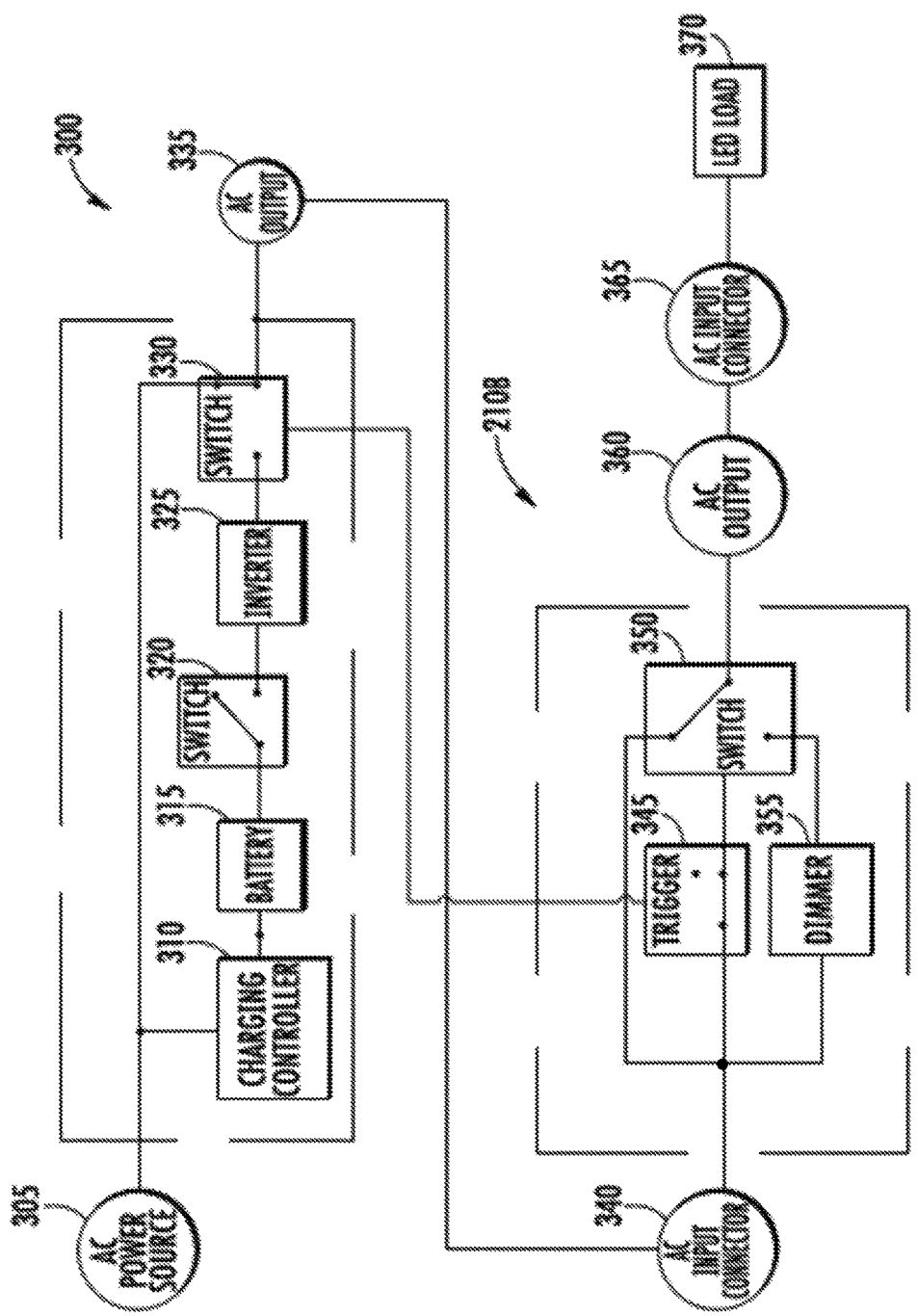
Figure 4B:
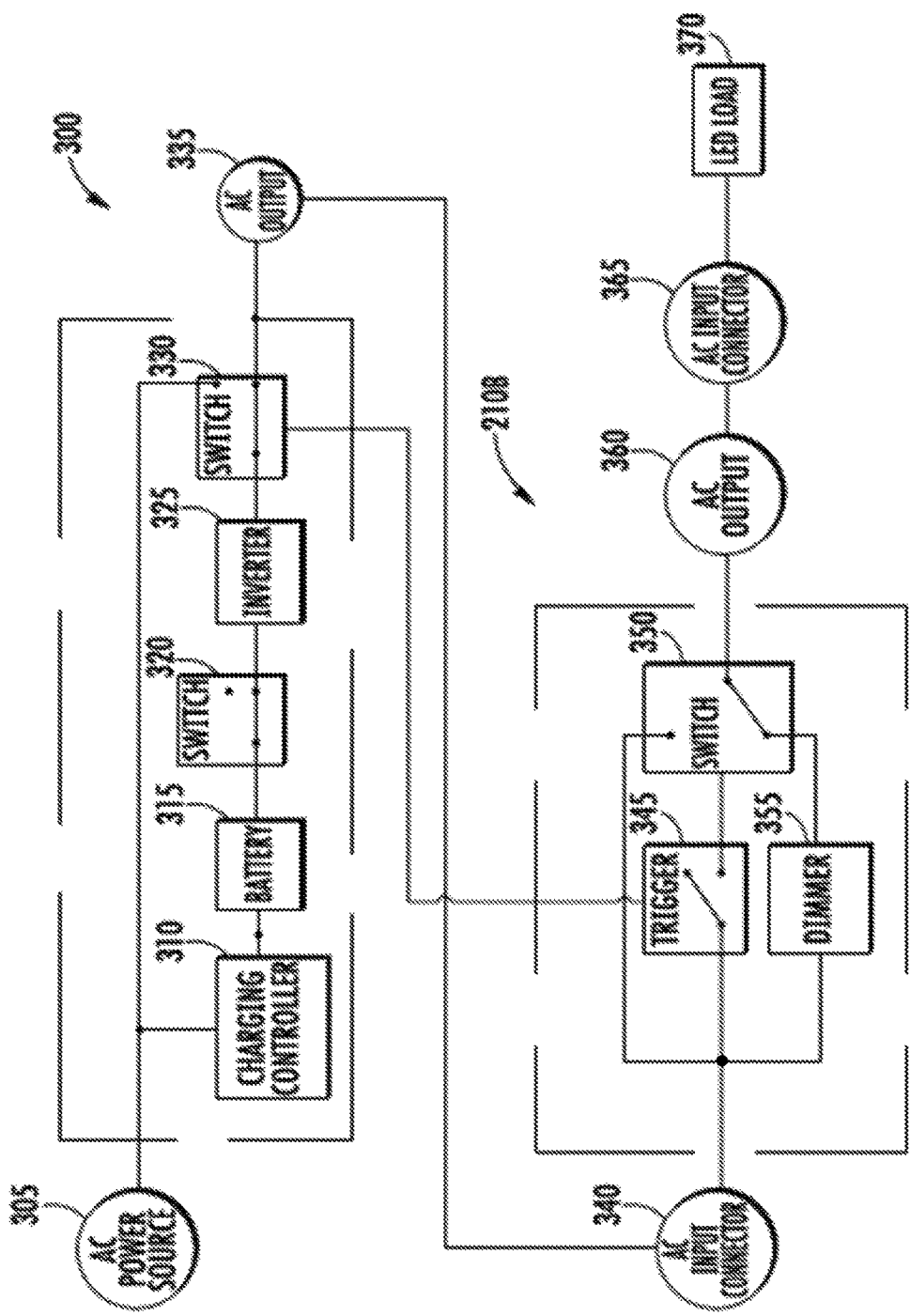

With reference to FIGS. 4A-4B, an example of an emergency backup system combining a UPS system 300 and a switched dimmer device 210B is described. The UPS system 300 may use a direct mains line voltage AC power source at an input connector 305. The switched dimming device 210B may connect to a dimmable LED load 370. AC power source is applied to the input of the UPS system 300 via the input connector 305 and provides power to a charging controller 310 that is connected in series to a battery 315, which also connects to a switch 320 in series. The switch 320 that is couplable to the input of an inverter 325. When the system is at normal AC power condition, the switch 320 is disconnected, and the output of inverter 325 is disconnected by way of switch 330, so that AC power source 305 connects directly to an output 335. The system may then flow the power of AC power source 305 directly to an AC input connector 340 of device 210B by way of AC output 335.

In FIG. 4A, in some embodiments, the switched dimmer device 210B is in essence connected directly to the active input AC power source 305, and have similar structure of embodiments in FIG. 3. In some embodiments, the switched dimmer device 210B may include a dimmer 355. The dimmer 355 may connect to the input connector 340 and operate to dim an alternating current (AC) power source from the UPS 300 that is received at AC input connector 340. The dimmer 355 may also output a dimmed AC power. The dimmer 355 may be coupled to a LED load 370 via an output connector 360. The dimmer device 210B may also include a switch 350 that connects to the input connector 340, the dimmer 355, the trigger 345 and the output connector 360. The switch 350 may be operable to either connect a path between the dimmer and the output connector or connect a path between the input connector and the output connector, bypassing the dimmer. The dimmer apparatus 210B may also include a trigger 345 for causing the switch 350 to switch to different connecting paths. For example, the UPS system 300 can be configured to provide the AC power continuously to the input connector.

When the AC power to the UPS 300 is on at normal AC power condition, the trigger 345 can trigger the switch 350 to connect the path between the input connector 340 and the output connector 360 to provide a full power of the AC power to the LED load 370. In FIG. 4B, when the AC power to the UPS 300 is interrupted, the loss of AC power may cause the trigger 345 to trigger the switch 355 to connect the path between the dimmer 230 and the output connector to output the dimmed AC power to the LED load 370. The trigger 345 and switch 345 may work in a similar manner as trigger 220 and switch 225 described in the embodiments in FIGS. 3A and 3B above. Similar to the embodiments in FIGS. 3A and 3B, the trigger 345 may also be connected either to the switch 330 via a DPST or DPDT switch. Alternatively, and/or additionally, the trigger 345 may also be connected to the AC power source and become part of a relay to control the switch 350.

Figure 5A:
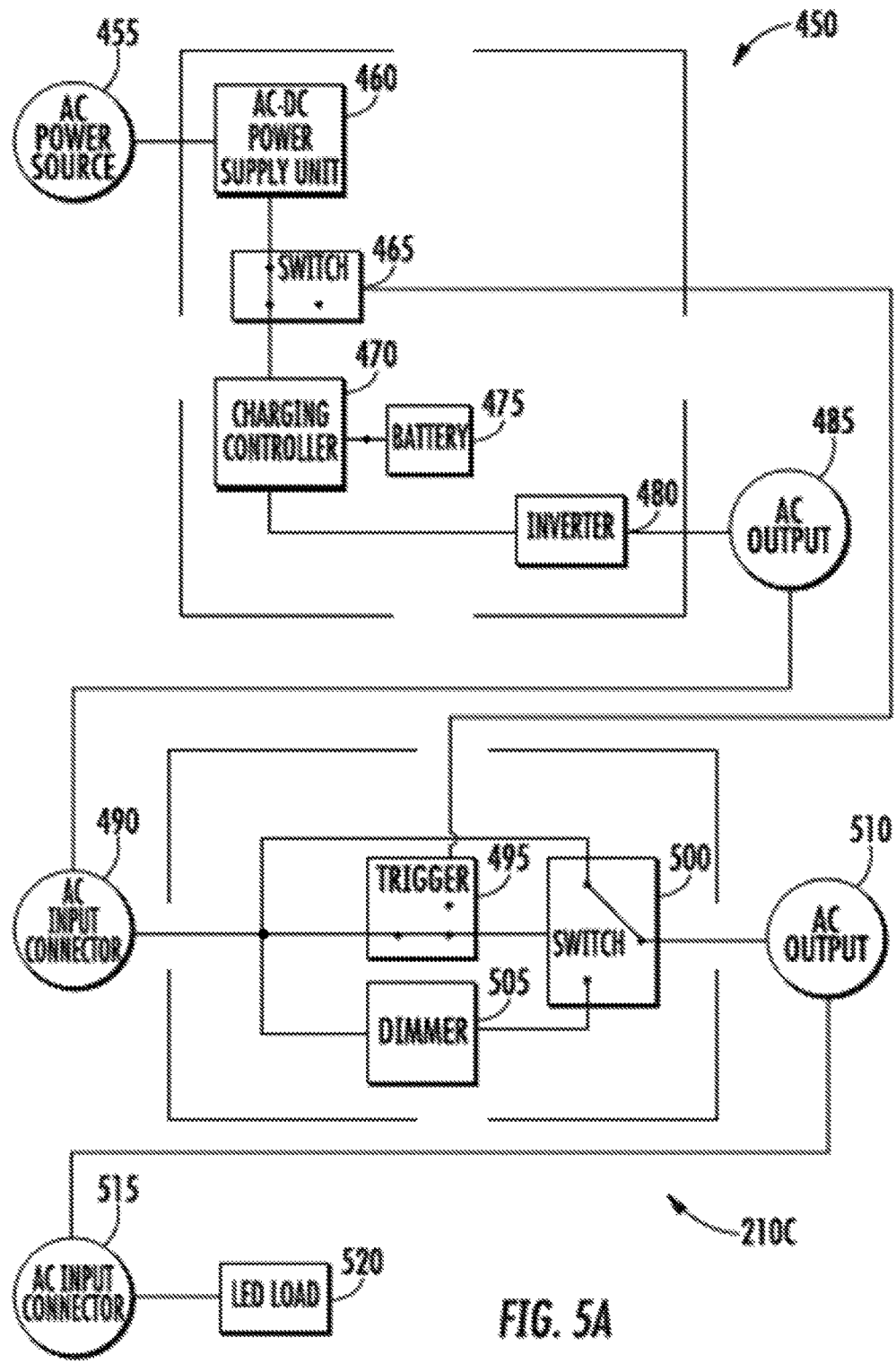
Figure 5B:
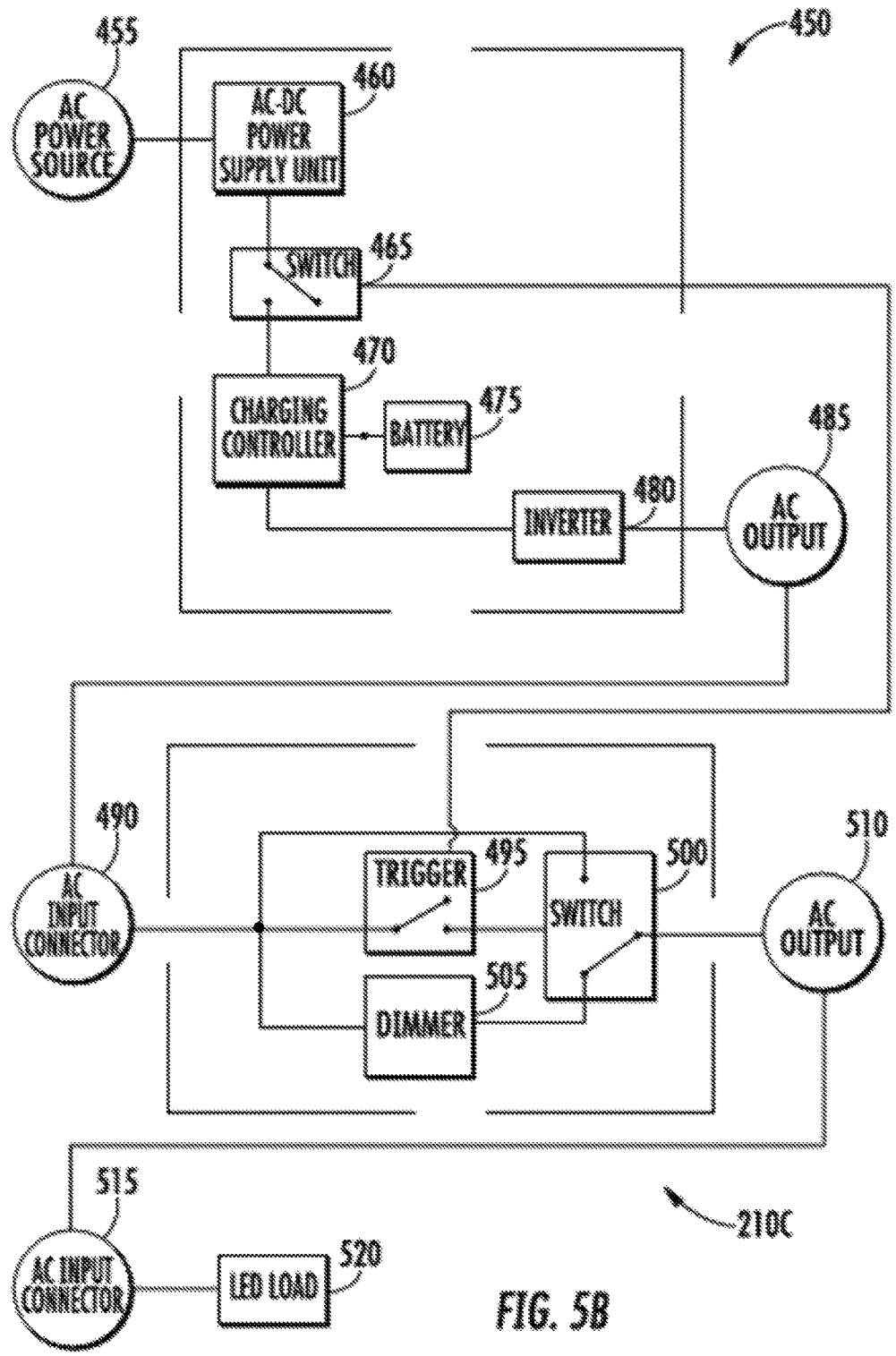

With reference to FIGS. 5A-5B, an example of an emergency backup system combining a different type of UPS system 450 and a switched dimmer device 210C is described. The UPS system 450 may use a direct mains line voltage AC power source received at input connector 455, and use a AC-DC power supply unit (PSU) 460. The PSU 460 may have a multi-voltage input and multi-voltage output. For example, PSU 460 can be an AC adapter and have an output of 12 VDC power. The switched dimming device 210C may connect to a dimmable LED load 520. AC power source may be applied to the input connector 455 of the UPS system 450 and provides power to a charging controller 470 connected to a battery 475. A switch 465 may be placed in series between the PSU 460 and the charging controller 470. The DC output from PSU 460 may be passed to inverter 480. During the normal AC power condition, when the AC power source is on, the output of inverter 480 passes AC power directly to AC output 485. The AC power then flows directly to AC input connector 490 of device 210C by way of AC output 485.

In FIG. 5A, in some embodiments, the switched dimmer device 210C may have similar structure of embodiments in FIG. 3. In some embodiments, the switched dimmer device 210C may include a dimmer 505. The dimmer 505 may connect to an input connector and operate to dim an alternating current (AC) power source from the UPS system 450 received at AC input connector 490. The dimmer 505 may also output a dimmed AC power. The dimmer 505 may be coupled to a LED load 520 via an output connector 510. The dimmer device 210C may also include a switch 500 that connects to the input connector 490, the dimmer 505, the trigger 495 and the output connector 510. The switch 500 may be operable to either connect a path between the dimmer and the output connector or connect a path between the input connector and the output connector, bypassing the dimmer. The switched dimmer device 210C may also include a trigger 495 for causing the switch 500 to switch to different connecting paths. For example, the UPS system 450 can be configured to provide the AC power continuously to the input connector.

When the AC power to the UPS 450 is on at normal AC power condition, the trigger 495 can trigger the switch 500 to connect the path between the input connector 490 and the output connector 510 to provide a full power of the AC power to the LED load 510. In FIG. 5B, when the AC power to the UPS 450 is interrupted, the loss of AC power may cause the trigger 495 to trigger the switch 500 to connect the path between the dimmer 505 and the output connector 515 to output the dimmed AC power to the LED load 520. In some embodiments, the switch 500 and the trigger 495 may operate in the same manner as trigger 220 and switch 225 described in the embodiments in FIGS. 3A and 3B to control the switching of connection paths upon loss of AC power. Similar to the embodiments in FIGS. 3A and 3B, the trigger 495 may also be connected to the switch 465 via a DPST or DPDT switch. Alternatively, and/or additionally, the trigger 495 may also be connected to the AC power source and become part of a relay to control the switch 500.

In some embodiments, in FIGS. 4 and 5, the dimmer 355, 505 may be internally positioned inside of or externally positioned outside of device 210B, 210C. In some embodiments, the LED load 370, 520 may include an AC LED module, a conventional AC LED driver, or a DC LED board. In some embodiments, the LED load 370, 520 may be dimmable.

Figure 6A:
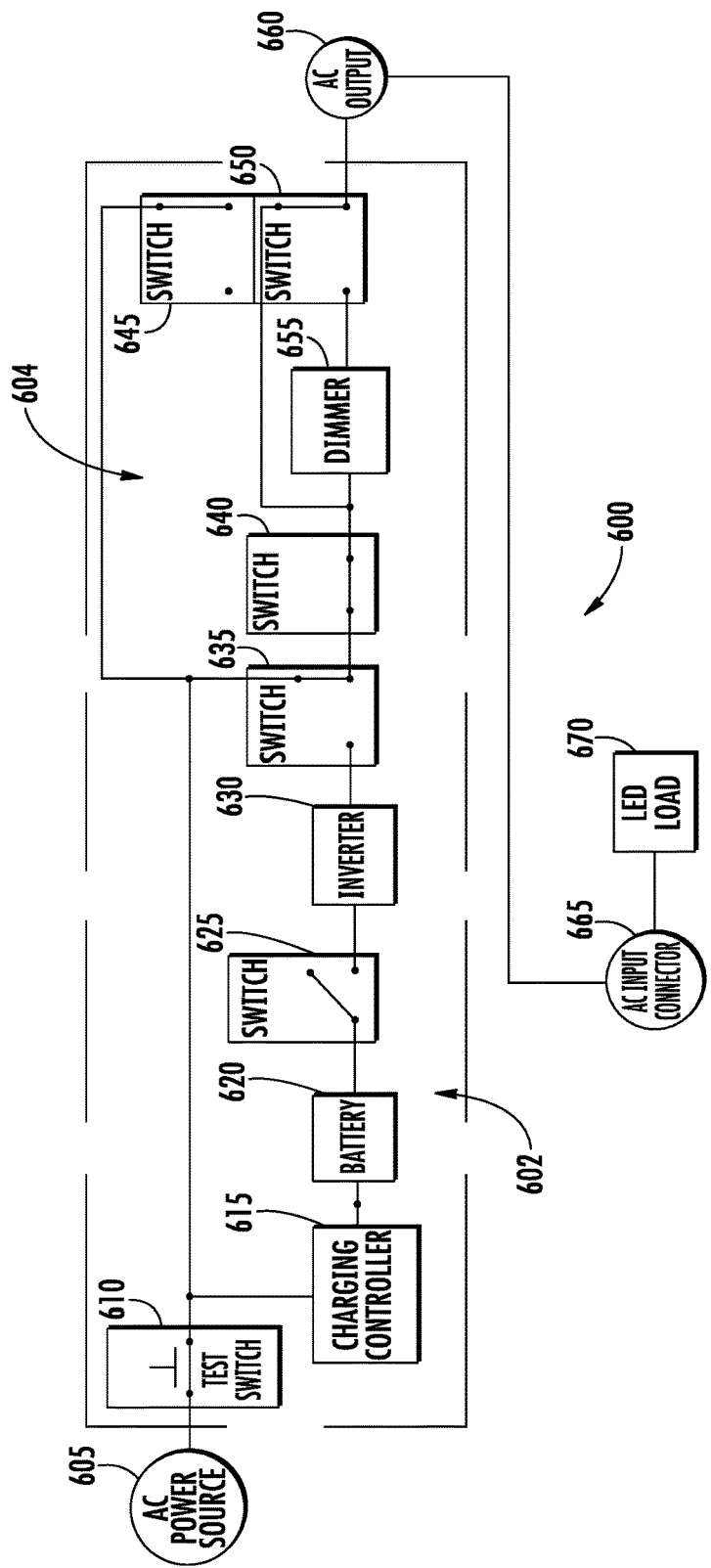
Figure 6B:
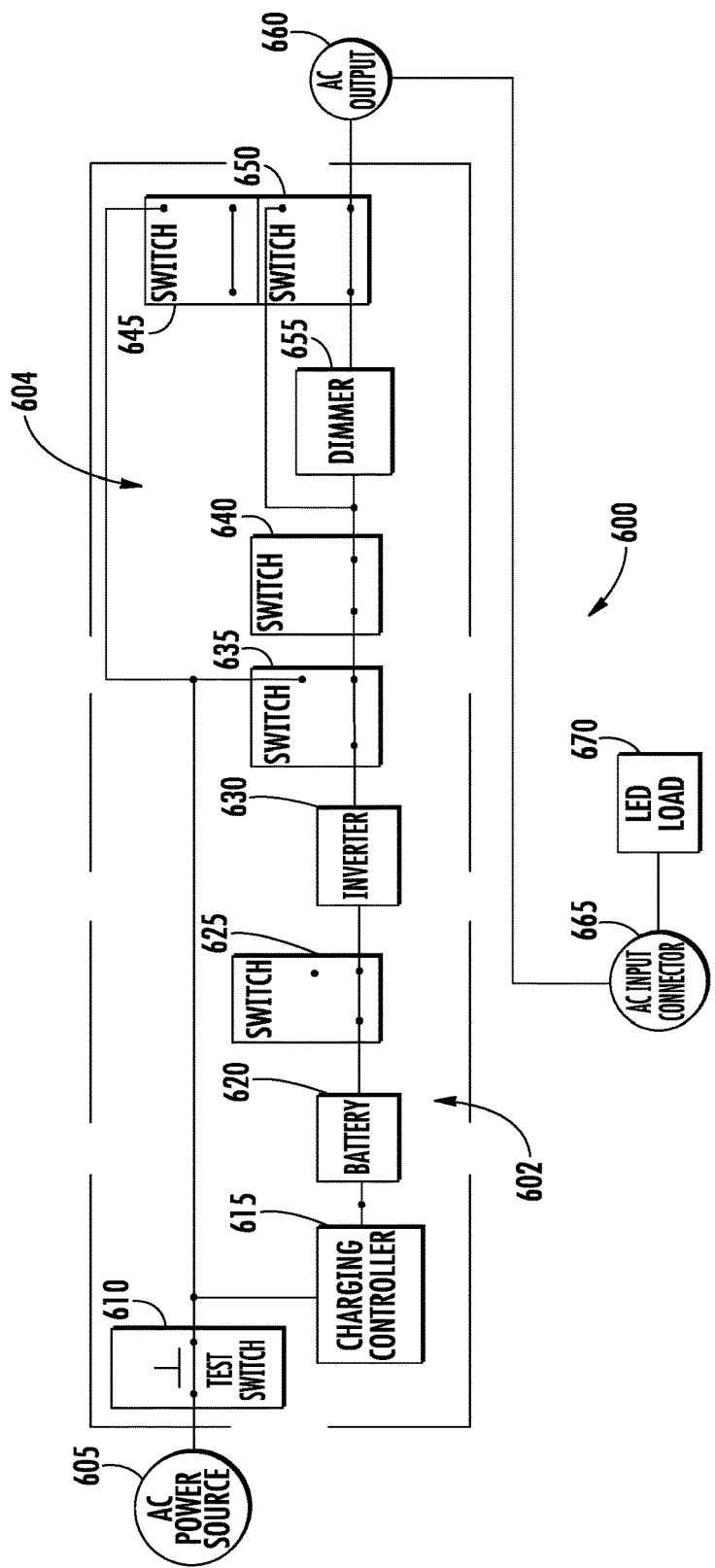

Various embodiments of an emergency backup system are further described with reference to FIGS. 6A and 6B. In FIG. 6A, according to some embodiments, an integrated emergency backup system 600 may include an inverter 630 operable to convert a direct current (DC) power to an alternating current (AC) power, a dimmer 655 operable to dim the AC power from the inverter to output a dimmed AC power, and a charging circuit 602. In some embodiments, the charging circuit 602 may be configured to deliver a charging voltage from an AC power source received at an input connector 605 to a battery 620 when the AC power source is on. The charging circuit 602 may also provide a DC power, directly or indirectly, to the inverter 630. The system 600 may also include a switch assembly 604 operable to supply a full power of AC power or dimmer AC power to a load 670. In some embodiments, the switch assembly may be configured to supply a full power of the AC power source to the load 670 via an output connector 660 when the AC power source from input connector 605 is on. In FIG. 6B, in some embodiments, when the AC power source is interrupted, the switch assembly may be configured to supply a DC power from the battery 620 to the inverter 630 and to the dimmer 655, and output the dimmed AC power from the dimmer 655 to the load 670. The details of various components of the system are now further explained.

With further reference to FIGS. 6A and 6B, in some embodiments, the battery 620 may be an internal battery. In some embodiments, the battery may be an external battery which is connected to the system via connectors or wires. The use of internal battery will allow the system to be built in a small footprint, such as a 4-inch box that can meet the needs of most loads, such as lighting fixtures. The use of external battery will allow the system to be adapted to a wide range of applications in which a continuous supply of power is critical and a longer on-battery runtime of available backup power during a power loss is required. In some embodiments, the dimmer 655 may be an AC phase dimmer.

In some embodiments, the charging circuit 602 may include a charging controller 615 placed in series between the input connector 605 and an input of the battery 620. The charging controller may be operable to deliver a charging voltage from the AC power source received at input connector 605 to the battery 620 when the AC power source is on. In some embodiments, the charging circuit 602 may also include an inverter switch 625 coupling an output of the battery 620 to an input of the inverter 630. The inverter switch 625 may be electronically controlled. It may be configured to cause an open circuit between the battery 620 and the inverter 630 when the AC power source is on (FIG. 6A). The inverter switch 625 may also be operable to connect a path between the battery 620 and the inverter 630 when the AC power source is interrupted (FIG. 6B). In such a way, the inverter switch will cut off power from the battery to the inverter when the AC power source is on, and enable a transfer of power from the battery to the inverter when the AC power source is interrupted.

In some embodiments, the switch assembly 604 may include one or more switches. For example, the switch assembly 604 may include a first dimmer switch 650 coupling the dimmer 655 to the output connector 660, and is operable to either connect the dimmer to the output connector or to bypass the dimmer. The switch assembly may include a second dimmer switch 645 connecting a path between the input connector 605 and the first dimmer switch 650. The second dimmer switch 645 may be operable to trigger the first dimmer switch to work in different modes. For example, the second dimmer switch 645 may be configured to trigger the first dimmer switch 650 to bypass the dimmer when the AC power source is on (FIG. 6A) and to connect a path between the dimmer and the output connector when the AC power source is interrupted (FIG. 6B).

In some embodiments, the switch assembly 604 may further include an additional switch 635, which can connect to the inverter 630, the input connector 605 and the dimmer 655. The additional switch 635 can be operable to connect a path between the input connector and the dimmer when the AC power source is on (FIG. 6A); and connect a path between the inverter and the dimmer when the AC power source is interrupted (FIG. 6B).

Alternatively, and/or additionally, the system 600 may include a test switch 610 that may be operable to allow a user to cut off the AC power source 605 to test the emergency backup system to simulate loss of AC power. In some embodiments, the test switch 610 may connect to the input connector 605 before all other components of the system. When the test switch is activated, the AC power source will be cut off from the system 600. In some embodiments, the test switch 610 can be any suitable switches, such as a button switch, a toggle switch, a pole switch, a rocker switch, a light switch etc. In some embodiments, the test switch may be installed as part of the system 600 or externally.

Figure 7A:
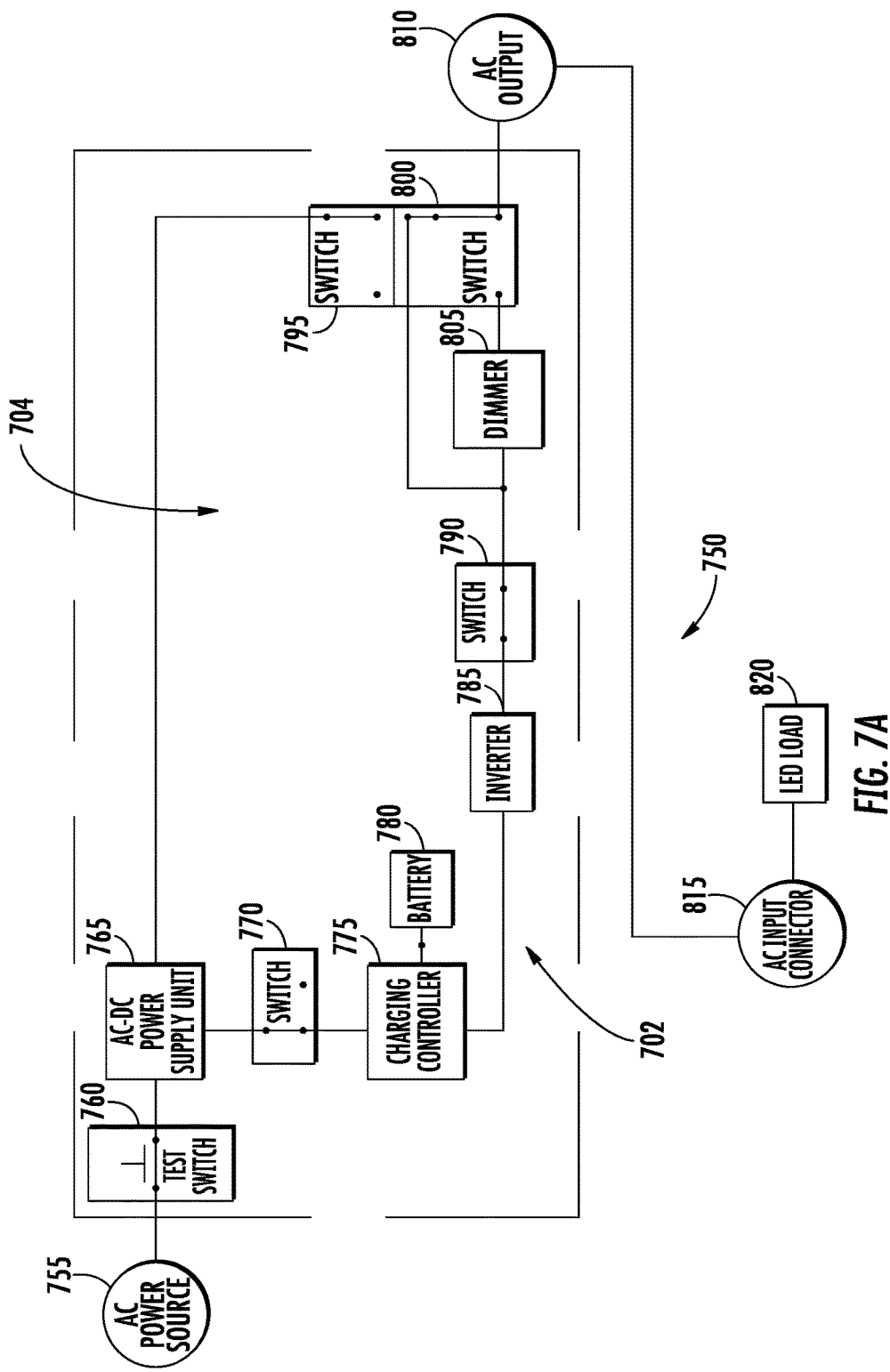
Figure 7B:
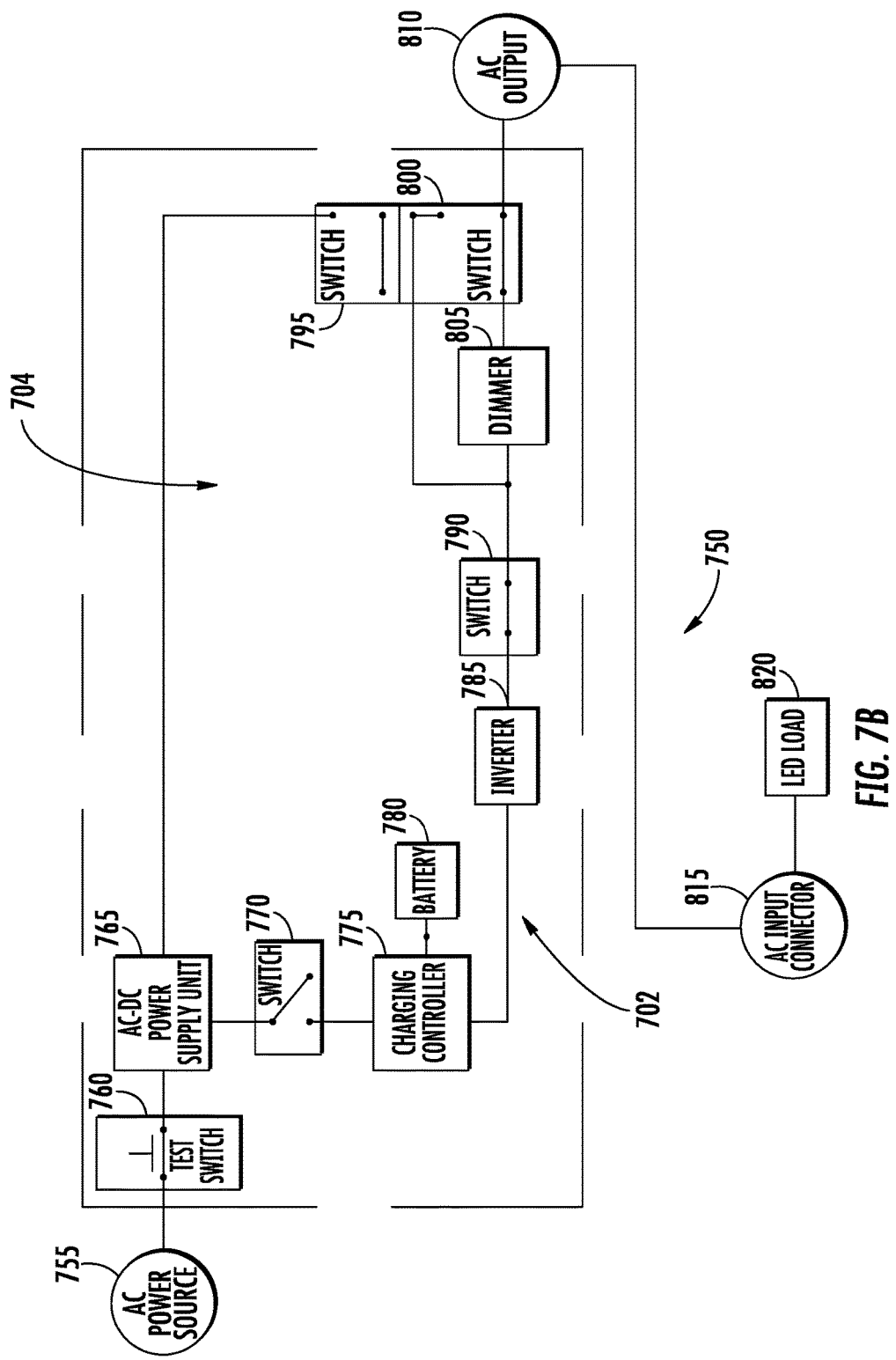

In some embodiments, as shown in FIGS. 7A-7B, an integrated emergency backup system 700 may have similar structure as the system shown in embodiments in FIGS. 6A and 6B. For example, in FIG. 7A, the system 750 may include an inverter 785 operable to convert a direct current (DC) power to an alternating current (AC) power, a dimmer 805 operable to dim the AC power from the inverter to output a dimmed AC power, and a charging circuit 702. In some embodiments, the charging circuit 702 may be configured to deliver a charging voltage from an AC power source received at an input connector 755 to a battery 780 when the AC power source is on. The charging circuit 702 may also provide a DC power, directly or indirectly, to the inverter 785.

The system 750 may also include a switch assembly 704 operable to supply a full power of AC power or dimmed AC power to a load 820. In some embodiments, the switch assembly may be configured to supply a full power of the AC power source to the load 820 via an output connector 810 when the AC power source from input connector 755 is on. In FIG. 7B, in some embodiments, when the AC power source is interrupted, the switch assembly 704 may be configured to supply a DC power from the battery 780 to the inverter 785 and to the dimmer 805, and output the dimmed AC power from the dimmer 805 to the load 820. The system 750 may also have variations from the embodiments in FIGS. 6A and 6B. The details of various components of the system are now further explained.

In some embodiments, the charging circuit 702 of the system 750 may include a AC-DC power supply unit (PSU) 765, which connects to the input connector 755 for receiving AC power and is placed between an input connector and the charging circuit 702. The PSU 765 may also be placed between the input connector 755 and the switch assembly 704. The charging circuit 702 may also include a charging controller 755 connecting to a battery 780, and is operated to deliver the charging voltage from the AC power source 755 to the battery 780 when the AC power source is on. The charging circuit 702 may also include a charging switch 770 connecting or placed in series between the power supply unit 765 and the charging controller 775. In some embodiments, the charging switch 770 may be operated to connect the power supply unit 765 to the charging controller 775 when the AC power source is on (FIG. 7A), and to disconnect between the PSU 765 and the charging controller 775 when the AC power source is interrupted (FIG. 7B).

In some embodiments, the switch assembly 704 of the system 750 may include a first dimmer switch 800 coupling the dimmer 805 to the output connector 810, and is operated either to connect the dimmer to the output connector or to bypass the dimmer. The switch assembly 704 may also include a second dimmer switch 795 that couples PSU 765 to the first dimmer switch 800, and is operated to trigger the first dimmer switch 800 to either bypass the dimmer when the AC power source is on (FIG. 7A) or to connect the dimmer 805 to the output connector 810 when the AC power source is interrupted (FIG. 7B).

The illustrated embodiments in FIG. 6 and FIG. 7 may be further configured to operate in two modes: phase dimming and 0-10 v output dimming. In phase dimming mode, the system will output the dimmed AC power as described above. For example, as shown in FIGS. 7A and 7B, the system may be configured to cause the output connector to output a full power of the AC power source when the AC power source is on (FIG. 7A), and output the dimmed AC power when the AC power source is interrupted (FIG. 7B).

In 0-10 v output dimming mode, the system may include a DC output connector and output a DC low voltage, which can be used for controlling a low voltage dimmer to a LED load. The low voltage dimmer can be internal or external to the emergency backup system. In some embodiments, when AC power is interrupted, the system may output a 0-10 v dimming signal at the DC output connector. The system may also output a full output AC power and bypass the internal dimmer. This is because that some low voltage dimmer also requires a full AC power to power it.

In order to bypass the dimmer during a loss of AC power source, in some embodiments, the charging circuit and switch assembly may operate in a different manner than that was described in the embodiments in FIGS. 6 and 7. For example, as shown in FIGS. 7A and 7B, the switch assembly 704 may also be configured to operate in a reversed manner as described above. In some embodiments, the first dimmer switch 800 and the second dimmer switch 795 may be configured to operate in a reversed manner as previously described, i.e. when the AC power source is interrupted, the switch assembly will be configured to bypass the dimmer 805 and instead connect a path between the PSU 765 and the output connector 810, providing a full AC power to the LED load.

In outputting the low voltage signal, in some embodiments, the system may use a dial, such as a rotary BCD dial, to set the level of the low voltage signal. In some embodiments, the system may regulate the low voltage signal using a microprocessor to automatically output the low voltage output signal. In some embodiments, the system may passively use a resistor bridge that includes equal value resistors connected at 10 vdc to 0 vdc ground with individual tap offs at each resistor connection level for the 9 v to 1 v outputs. In some embodiments, the system may use separate voltage regulators with different fixed voltage outputs. In some embodiments, the system may also use a variable output voltage regulator.

Alternatively, and/or additionally, the system may not bypass the dimmer during loss of AC power, but instead the system may output a dimmed phase cut AC power and simultaneously a 0-10 v low voltage signal that corresponds to a level setting determined by, for example, a rotary BCD dial.

In some embodiments, the illustrated embodiments in FIGS. 6A and 6B may also be configured to operate in two modes: the phase dimming and 0-10 v output dimming, as described in embodiments of FIGS. 7A and 7B. In phase dimming mode, the system may output the dimmed AC power as described above. For example, as shown in FIGS. 6A and 6B, the system may be configured to cause the output connector to output a full power of the AC power source when the AC power source is on (FIG. 6A), and output the dimmed AC power when the AC power source is interrupted (FIG. 6B).

In 0-10 v output dimming mode, the system may include a DC output connector and output a DC low voltage, which can be used for controlling a low voltage dimmer to a LED load. The low voltage dimmer can be internal or external to the emergency backup system. In producing the low voltage, the system may be configured to cause the output connector to output a full power of the AC power source when the AC power source is on. In the loss of AC power, the system may be configured to cause the output connector to output a full power of the AC power source and also cause the DC connector to output the DC low voltage. This is because that some low voltage dimmer also requires a full AC power to power it.

In some embodiments, when the AC power is interrupted, the system may be configured to bypass the dimmer and instead output a full AC power. In order to achieve this, the switch assembly 604 may be configured to operate in a reversed manner as described above. For example, the additional switch 635 can be configured to connect a path between the inverter and the dimmer when the AC power source is on; and connect a path between the input connector and the dimmer when the AC power source is interrupted. Similarly, the second dimmer switch 645 may be configured to trigger the first dimmer switch 650 to connect a path between the dimmer and the output connector when the AC power source is on and to bypass the dimmer when the AC power source is interrupted.

In some embodiments, for various embodiments in FIG. 6 and FIG. 7, the switch between the phase dimming mode and the 0-10 v output dimming mode can be done via a jumper to header pins. In some embodiments, the system may include an AC dimmer setting switch, such as a dial, operated to preset a dimming level for the dimmer. The system may also include a DC dimmer setting switch operated to preset a dimming level for the DC low voltage ranging between 0 and 9 volts. In some embodiments, the DC low voltage may also be in other ranges. In some embodiments, the system may optionally include safety switches 640, 790 that allow the system to disconnect from the load.

In the illustrated embodiments, various switches (FIGS. 3-7) or the switch assembly (604, 704 in FIG. 6 or FIG. 7) may be an electromechanical relay or a solid state relay. For example, the switch can be an one channel DC 12V High/Low level power relay module board made by Smakn. Battery 620, 780 may be internally positioned inside of or externally positioned outside of emergency backup device. It can be any suitable rechargeable battery such as 12 VDC or 24 VDC rechargeable battery. The LED load may include an AC LED module, or a conventional AC LED driver, DC LED board, or other load. The LED load 670, 820 may also be dimmable. For example, the LED load may be a dimmable 120 vac, 105 w AC driver-on-board (DOB) board mounted to a heat sink, such as that made by Seoul Semiconductor.

In the illustrated embodiments, the dimmer, such as dimmer 230, 355, 505, 655, 805 (in FIGS. 3-7), may be internally positioned inside of or externally positioned outside of emergency backup device. The dimmers may be of different types and have different dimmer level settings. For example, the dimmer may be an AC phase cut dimmer made by Lutron. Other dimmers may also include AC dimmers of various types, such as dials, sliders, preset buttons, Binary Coded Decimal (BCD) rotary, thumbwheel switches, and dipswitches that can be set manually or automatically in software. For example, the apparatus or system may use a microprocessor to set the dimmer level. The switch settings and the actions for the corresponding actions the system is to take can be programmed using a programming logic array (PLC) or discrete circuitry connected to each switch setting.

An AC phase dimmer can chop the AC sine wave either on the leading edge, trailing edge, or both edges and may include all families of triode alternating current switch (triac) and electronic low voltage (ELV) types of dimmers. In the illustrated embodiments, the chopping of the sine wave achieves the dimming of the AC outputs to the LED loads, providing necessary illumination time periods and outputs required for safe egress during an emergency backup and loss of AC power condition. Other method of dimming can be pulse width modulation (PWM) of the AC output sine wave producing frequencies higher than the standard 50/60 Hertz found on typical mains line voltage AC power.

Figure 8:
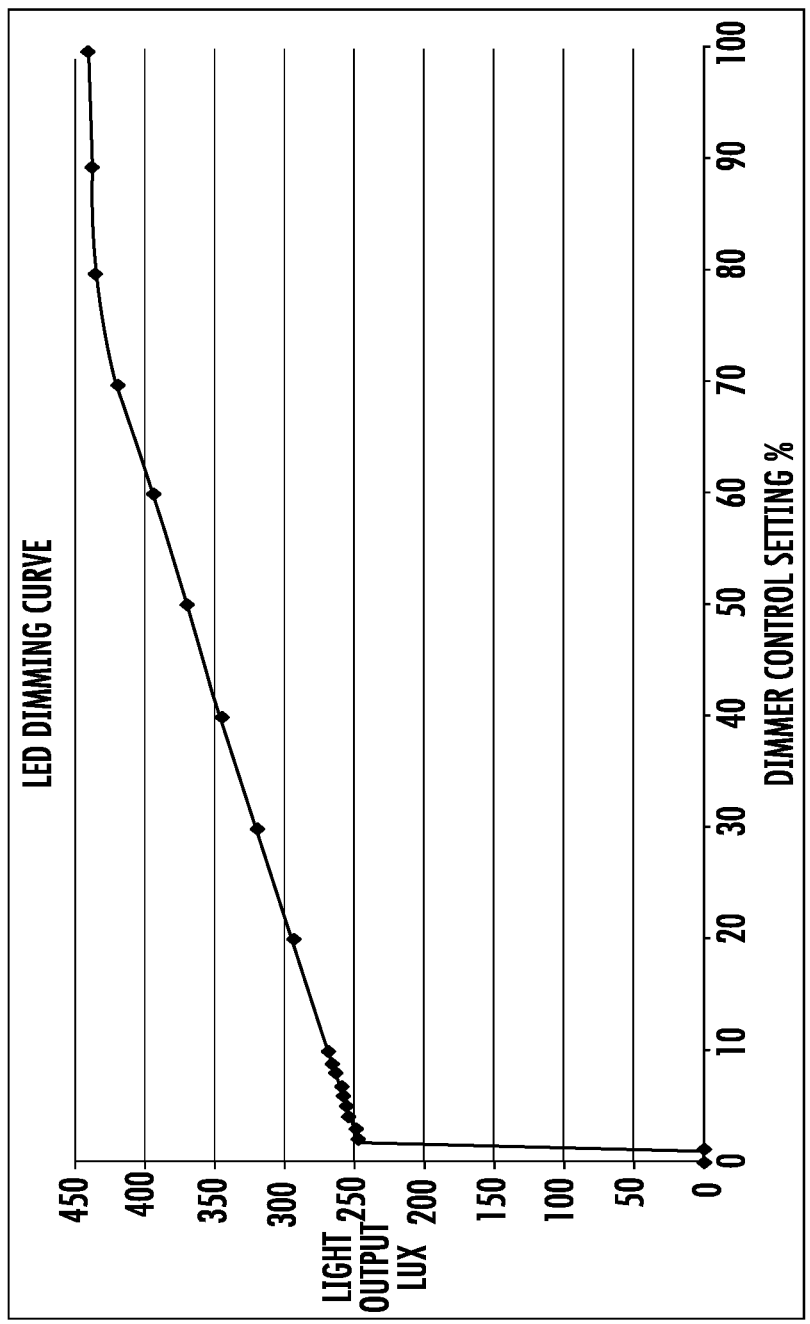
FIG. 8 illustrates a logarithmic type graph showing a dimmer level setting versus the lumen light output from a dimmable LED load in an emergency backup system according to some embodiments.

FIG. 8 is a logarithmic type graph showing a dimmer level setting versus the lumen light output from a dimmable LED load according to some embodiments described above. As shown in FIG. 8, the lumen output falls gradually as the dimmer level setting is decreased from 100% down to less than about 5% and then drops quickly at the lowest dimmer level setting because the LEDs simply turn off. This means that the dimmer level setting has to be set to a low level setting during a loss of AC power emergency backup condition to produce the minimum amount of required illumination light output during a power failure at the lowest LED load for a longer length of illumination period of time. In some embodiments, the dimmer level settings can be either fixed or adjustable.

Figure 9A:
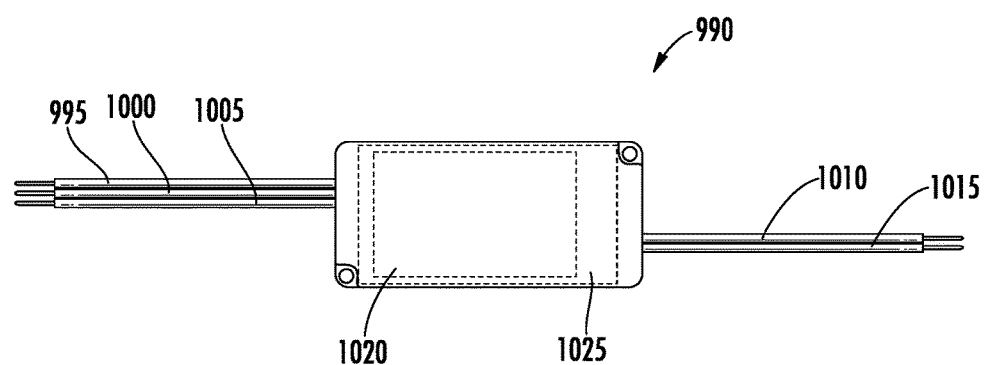
FIGS. 9A and 9B show multiple views of an example of an improved emergency backup device for dimmable LED loads according to some embodiments.
Figure 9B:
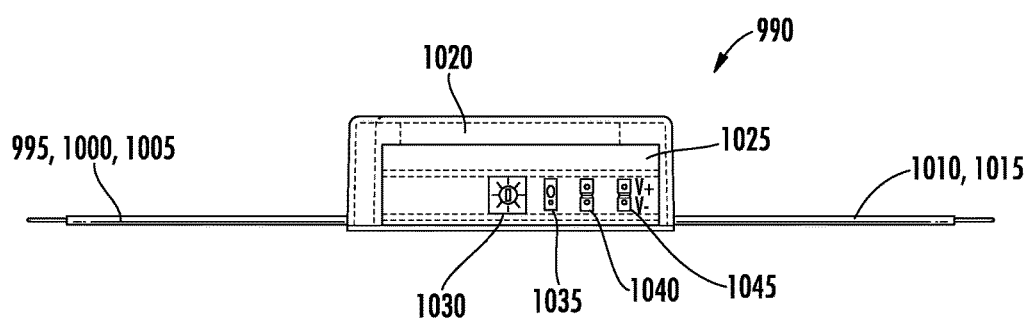

The illustrated embodiments above can be made into different various configurations and form factors in an emergency backup system or device. For example, FIGS. 9A and 9B show multiple views of an alternate package for an improved emergency backup device 990 for dimmable LED loads according to some embodiments. The embodiments in FIGS. 9A and 9B can be made small and compact, and can fit inside a standard 4-inch octagonal junction box (not shown).

In some embodiments, the input connectors black wire 995, and white wire 1000 are the input AC power leads to the emergency backup device 990. The AC power may be typically in the range from 100 vac to 277 vac at 50/60 Hz or can be distinct input voltages like 120 vac, 60 Hz; 240 vac, 50 Hz, etc. The red wire 1005 and white wire 1000 are the output voltage power leads from emergency backup device 990 for connection to an external remotely located dimmable LED driver (not shown) or to a dimmable AC DOB LED lighting module (not shown) or to a low-voltage 0-10 v dimmer if needed, because some 0-10 v dimmers may require a separate source of full AC power to operate properly. Output low voltage 0-10 v dimmer control signal wires designated as DIM+ purple wire 1010 and DIM− grey wire 1015 can also be included in the device 990. Other colors of wires may also be used.

In some embodiments, the device 990 may include a battery 1020. The battery may primarily be a rechargeable type, such as a Lithium Polymer or Lithium-Ion Polymer (LiPo or Li—Po) battery, which may be of small size, storage and cycle times. The device may also include a circuit board 1025 that contains the internal power supply unit, battery charger, inverter, phase dimmer, switches, etc. The device may also include a rotary BCD switch 1030 used to preset the dimming level output. A setting of 0 on the dial will turn off the emergency backup device with an output of 0%. For linear phase dimming, a dial setting of 1 puts the output at 10%; 2 at 20%; 3 at 30%; etc. up to a dial setting of 9 at 90% output. For a linear 0-10 v output dimming signal, a dial setting of 1 puts out 1 v; 2 at 2 v; 3 at 3 v; etc. with an output of 9 v when the dial is set to 9.

In some embodiments, the device 990 may also include a switch 1035, which can be a 3-pin header with a jumper used for selecting the output dimming mode, i.e. phase dimming or 0-10 v low voltage dimming. A user can select internal phase dimmer or external 0-10 v dimming signals. When internal phase dimming is selected, there is no output to DIM+ purple wire 1010 and DIM− grey wire 1015. The phase dimming voltage signal is output on red wire 1005 and white wire 1000 for connection to dimmable loads. When 0-10 v dimming is selected, output red wire 1005 will provide full AC power for connection to an external low voltage 0-10 v dimmer if needed (not shown). The device 990 may also include an on-board connector 1040 for the connection of a test switch or battery indicators. Examples of test switch may include single Illuminated Test Switch (ITS), Threaded Body Test Switch (TBTS), Lighted Push-Button Test Switch (LPTS) or similar test switch. The device 990 may also include a connector 1045 provided for the optional connection of an external rechargeable battery (not shown) to increase the power handling capability of the backup device.

Other variations of illustrated embodiments as would be clear from one ordinarily skilled in the art may also be possible. For example, batteries may be of other types besides the LiPo or Li—Po battery type. Rotary BCD switch 1030 and dimmer selection switch 1035 can be other types of switches including DIP switches and headers and discrete jumpers, etc. Further, connectors 1040 and 1045 can be any suitable type of connector or can also be discrete lengths of jumper wires for direct connections to external components like test button switches and indicators and external batteries as described. Single combination push-button test switch and battery charging indicator can also be a separate push-button test switch and a separate battery charging indicator light.

An integrated lighting fixture using some illustrated embodiments may be possible. As an example, FIGS. 10A-10C show different embodiments of a LED lighting fixture. FIG. 10A shows a conventional ceiling mounted lighting fixture 1050 attached to a junction box 1065. DC LED board 1055 with an AC LED driver 1060 may provide power to the LEDs in DC LED board 1055. The AC LED driver 1060 may be a dimmable constant current driver that can be dimmed by phase control on the AC power input wires or by low voltage 0-10 v dimming wires depending on the type of driver.

FIG. 10B shows DC LED board 1075 with an AC LED driver 1080 similar to the embodiments shown in FIG. 10A, and the new emergency backup device 1090 is located in the junction box 1085 or it can be installed in the lighting fixture 1070. AC LED driver 1080 is a dimmable constant current driver that can be dimmed by phase control on the AC power input wires or by low voltage 0-10 v dimming wires depending on the type of the driver. In some embodiments, FIG. 10C shows an AC driverless or DOB driver-on-board LED board 1105 with the emergency backup device 1110 installed on the same side as the AC DOB LED board 1105 inside the lighting fixture 1095, which is attached to a junction box 1100. An additional external battery (not shown) can be mounted to the underside of the lighting fixture 1095 or inside the junction box 1100 to provide additional emergency backup power and duration to AC DOB LED board 1105.

In a experimental test, an emergency backup system that embodies some illustrated embodiments, including using an internal PSU and connecting to a dimmable 105 w AC LED load, is used. A first test was conducted with a fully charged UPS connected to the 105 w AC LED load with an AC phase cut dimmer set at 100%. During a loss of input AC power to the UPS, the 105 w AC LED load was energized at full output for 18-20 minutes before the UPS shut down and the illumination went dark.

The UPS was allowed to get fully charged again, but this time, the AC phase cut dimmer was set to 20%. For the second test, full AC power was passed to the 105 w AC LED load at full intensity as the 12 VDC AC adapter was active and the relay passed the full AC power from the UPS directly to the 105 w AC LED load. The AC phase cut dimmer was set to 20% this time. Next the AC power to the UPS was removed. The 12 VDC relay automatically switch the output of the UPS to the AC phase cut dimmer that provided a dimmed output to the 105 w AC LED load. The dimmed LED load continued to operate and put out a reduced light output for 95 minutes before going out. A light meter was used to test the light output of the 105 w AC LED load. At a 20% dimmer setting at a 15-foot distance, the light output read 1.7 foot-candles. The minimum requirement for emergency illumination is 1.0 foot-candles for 90 minutes of emergency battery backup.

The advantages of various illustrated embodiments over existing systems are therefore evident in that the system embodying the various illustrated embodiments will operate at or above minimally required illumination during a loss of AC power and achieve longer period of backup power during emergency. The emergency backup system, in the illustrated embodiment, combines an integral dimmer with inexpensive switches to offer an improved, compact, lightweight, and lower cost emergency backup solution for LED lighting systems. Ideally, in some embodiments, the emergency backup device can be designed to fit inside of a 4-inch or smaller octagonal junction box. The device can also be used in combination with present full power output UPS/IPS emergency backups as well as with present inverter emergency backup systems, or can be a dedicated emergency backup device for use with LED loads installed in single lighting fixtures with and without AC LED drivers.

The emergency backup device described in various embodiments will allow for tri-mode dimming, i.e. triode alternating current switch (triac) or electronic low voltage (ELV) phase dimming, and 0-10 v dimming. For phase-cut dimming, dimming with the emergency backup device is possible using internal solid state electronic circuitry that chops the AC voltage. The emergency backup device offers dimming compatibility with both phase-cut (reverse-phase and forward-phase) and with 0-10 v dimmers. Phase-cut dimming or 0-10 v dimming is selectable by the user with a jumper provided on the emergency backup device. Low voltage 0-10 v dimmers are used to dim the output current of the emergency backup device via the Dim+/Dim− signals. The 0-10 v Dim+/Dim− signals deliver 1% to 100% of the output current to the external 0-10 v dimmer.

There are two 0-10 v dimming transfer functions available, a linear curve where 10 v=100% of the output current and 1 v=10% of the output current, or a non-linear curve where the 9 v=100% of the output current and 1 v=1% of the output current. The linear curve is used primarily in the emergency backup device, but the non-linear curve is also available as an option. The non-linear curve is recommended when using standard in wall 0-10 v logarithmic dimmers to avoid having insufficient source current available to pull the dimmer up to 10 v and to account for the inability of the dimmer to pull below approximately 0.9 v. In these type of installations, the modified transfer function will ensure 100% light output and dimming down to 1% regardless of the number of 0-10 v drivers are on the 0-10 v dimming control line.

The emergency backup power system described in various embodiments is a necessary improvement over conventional UPS systems when used for emergency lighting by the addition of a dimmer connected to the output of the UPS to provide a dimmed output to an AC LED light source during an emergency power failure condition. The dimmer will provide a lower load to the UPS allowing for less drain on the backup power system to provide a longer period of required illumination for the minimum 90 minutes as required by Life Safety Codes and OSHA. An automatic switching device is also used to switch between full AC output from the UPS during normal operation and a dimmed AC output from the UPS during a power failure to the AC LED module.

The various illustrated embodiments also offer advantages such as the use with different wattage AC LED modules, backward compatible use with different wattage conventional dimmable AC LED drivers and DC LED light engines, the ability to operate with multiple input power voltage ranges, the versatility to be used with new dimmable AC LED modules made by different manufacturers, and the versatility to be used with both conventional dimmable AC LED drivers and DC LED light engines.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

The invention claimed is:

1. An emergency backup system, comprising:
an inverter operable to change a direct current (DC) power to an alternating current (AC) power;
a dimmer operable to dim power from the inverter to output a dimmed power;
a charging circuit operable to:
deliver a charging voltage from an AC power source received at an input to a battery when the AC power source is on, and
provide a DC power, directly or indirectly, to the inverter; and
a switch assembly comprising
a first dimmer switch coupling the dimmer to the output, and is operable to connect the dimmer to the output or to bypass the dimmer, and
a second dimmer switch connecting a path between the input and the first dimmer switch, and is operable to trigger the first dimmer switch to bypass the dimmer when the AC power source is on and to connect a path between the dimmer and the output when the AC power source is interrupted;
wherein the switch assembly is operable to:
when the AC power source is on, supply a full power of the AC power source to a load via an output, and
when the AC power source is interrupted, supply the dimmed power from the dimmer to the load via the output.

2. The system of claim 1, wherein the battery is an internal battery.

3. The system of claim 1, wherein the dimmer is an AC phase dimmer.

4. The system of claim 1, wherein the charging circuit comprises:
a charging controller connecting between the input and an input of the battery, and is operable to deliver the charging voltage from the AC power source to the battery when the AC power source is on; and
an inverter switch coupling an output of the battery to an input of the inverter, and is operable to connect a path between the battery and the inverter when the AC power source is interrupted and to cause an open circuit between the battery and the inverter when the AC power source is on.

5. An emergency backup system, comprising:
an inverter operable to change a direct current (DC) power to an alternating current (AC) power;
a dimmer operable to dim power from the inverter to output a dimmed power;
a charging circuit operable to:
deliver a charging voltage from an AC power source received at an input to a battery when the AC power source is on, and
provide a DC power, directly or indirectly, to the inverter; and
a switch assembly operable to:
when the AC power source is on, supply a full power of the AC power source to a load via an output, and
when the AC power source is interrupted, supply the dimmed power from the dimmer to the load via the output;
wherein the switch assembly comprises:
a first dimmer switch coupling the dimmer to the output, and is operable to connect the dimmer to the output or to bypass the dimmer; and
a second dimmer switch connecting a path between the input and the first dimmer switch, and is operable to trigger the first dimmer switch to connect a path between the dimmer and the output when the AC power source is on and to bypass the dimmer when the AC power source is interrupted.

6. The system of claim 5, wherein the switch assembly is an electromechanical relay or a solid state relay.

7. The system of claim 1, wherein the switch assembly further comprises a third dimmer switch connecting to the inverter, the input and the dimmer, and is operable to:
connect a path between the input and the dimmer when the AC power source is on; and
connect a path between the inverter and the dimmer when the AC power source is interrupted.

8. The system of claim 1, wherein the switch assembly further comprises a third dimmer switch connecting to the inverter, the input and the dimmer, and is operable to:
connect a path between the inverter and the dimmer when the AC power source is on; and
connect a path between the input and the dimmer when the AC power source is interrupted.

9. The system of claim 5, further comprising a test switch connecting to the input and operable to interrupt the AC power source to the input.

10. The system of claim 1, wherein the charging circuit comprises:
a power supply unit connecting to the input;
a charging controller connecting to a battery, and is operated to deliver the charging voltage from the AC power source to the battery when the AC power source is on; and
a charging switch connected between the power supply unit and the charging controller and is operated to connect the power supply unit to the charging controller when the AC power source is on, and to disconnect when the AC power source is interrupted.

11. An emergency backup system, comprising:
an inverter operable to change a direct current (DC) power to an alternating current (AC) power;
a dimmer operable to dim power from the inverter to output a dimmed power;
a charging circuit operable to:
deliver a charging voltage from an AC power source received at an input to a battery when the AC power source is on, and
provide a DC power, directly or indirectly, to the inverter; and
a switch assembly operable to:
when the AC power source is on, supply a full power of the AC power source to a load via an output, and
when the AC power source is interrupted, supply the dimmed power from the dimmer to the load via the output;
wherein the charging circuit comprises:
a power supply unit connecting to the input;
a charging controller connecting to a battery, and is operated to deliver the charging voltage from the AC power source to the battery when the AC power source is on; and
a charging switch connected between the power supply unit and the charging controller and is operated to connect the power supply unit to the charging controller when the AC power source is on, and to disconnect when the AC power source is interrupted;
wherein the switch assembly comprises:

a first dimmer switch coupling the dimmer to the output, and is operated to connect the dimmer to the output or to bypass the dimmer; and
a second dimmer switch connecting to the input and the first dimmer switch, and is operated to trigger the first dimmer switch to connect the dimmer to the output when the AC power source is on and to bypass the dimmer when the AC power source is interrupted.

12. The system of claim 11, further comprising a DC component, operated to output a DC low voltage for controlling a low voltage dimmer to a LED load.

13. The system of claim 12, further comprising an output switch having a phase dimming mode and a low voltage output dimming mode, and is operated to:
in the phase dimming mode:
cause the output to output the dimmed power when the AC power source is interrupted, and
cause the output to output a full power of the AC power source when the AC power source is on; and
in the low voltage output dimming mode:
cause the output to output a full power of the AC power source and cause the DC component to output the DC low voltage when the AC power source is interrupted, and
cause the output to output a full power of the AC power source when the AC power source is on.

14. The system of claim 13, wherein the output switch is a jumper to header pins.

15. The system of claim 13, further comprising an AC dimmer setting switch operated to preset a dimming level for the dimmer.

16. The system of claim 13, wherein the low voltage dimming mode is a −10v dimming mode.

17. A lighting system, comprising:
a light-emitting diode (LED) lighting fixture comprising one or more LEDs;
a LED load coupled to the LED lighting fixture for providing power to the one or more LEDs;
an inverter configured to change a direct current (DC) power to an alternating current (AC) power;
a dimmer configured to dim power from the inverter to output a dimmed power;
a charging circuit operated to:
deliver a charging voltage from an AC power source via an input to a backup battery when the AC power source is on, and
provide a DC power, directly or indirectly, to the inverter; and
a switch assembly operated to:
when the AC power source is on, supply a full power of the AC power source to the LED load, and
when the AC power source is interrupted, supply the dimmed power from the dimmer to the LED load;
wherein the switch assembly comprises:
a first dimmer switch coupling the dimmer to the LED load, and is operated to connect the dimmer to the LED load or to bypass the dimmer; and
a second dimmer switch connecting to the input and the first dimmer switch, and is operated to enable the first dimmer switch to bypass the dimmer when the AC power source is on and to connect the dimmer to the LED load when the AC power source is interrupted.

18. A lighting system, comprising:
a light-emitting diode (LED) lighting fixture comprising one or more LEDs;
a LED load coupled to the LED lighting fixture for providing power to the one or more LEDs;
an inverter configured to change a direct current (DC) power to an alternating current (AC) power;
a dimmer configured to dim power from the inverter to output a dimmed power;
a charging circuit operated to:
deliver a charging voltage from an AC power source via an input to a backup battery when the AC power source is on, and
provide a DC power, directly or indirectly, to the inverter; and
a switch assembly operated to:
when the AC power source is on, supply a full power of the AC power source to the LED load, and
when the AC power source is interrupted, supply the dimmed power from the dimmer to the LED load;
wherein the switch assembly comprises:
a first dimmer switch coupling the dimmer to the LED load, and is operated to connect the dimmer to the LED load or to bypass the dimmer; and
a second dimmer switch connecting to the input and the first dimmer switch, and is operated to enable the first dimmer switch to connect the dimmer to the LED load when the AC power source is on and to bypass the dimmer when the AC power source is interrupted.

19. The system of claim 17, wherein the LED load is dimmable by phase control, is further configured to:
output a full power of the AC power source when the AC power source is on; and
output the dimmed power to the LED load when the AC power source is interrupted.

20. The system of claim 17, wherein the LED load is dimmable by phase control, is further configured to:
output the dimmed power to the LED load when the AC power source is on; and
output a full power of the AC power source when the AC power source is interrupted.

21. The system of claim 17, wherein the LED load is dimmable by a low 0-10v voltage, is further configured to:
output a full power of the AC power source to the LED load when the AC power source is on; and
output a full power of the AC power source and a DC low voltage to the LED load when the AC power source is interrupted.

22. A LED dimmer apparatus couplable to a uninterrupted power supply (UPS) system, comprising:
a dimmer connecting to an input and operable to dim an alternating current (AC) power from a UPS received at the input to output a dimmed power to a LED load via an output, wherein the UPS is configured to provide the AC power continuously;
a first switch connecting to the input, the dimmer and the output, and is operable to connect a path between the dimmer and the output or connect a path between the input and the output bypassing the dimmer; and
a trigger device connecting between the input and the first switch, and is operated to:
trigger the first switch to connect the path between the input connector and the output to provide a full power of the power to the LED load when the AC power is on, and trigger the first switch to connect the path between the dimmer and the output connector to output the dimmed AC power to the LED load when the AC power is interrupted.

23. The LED dimmable apparatus of claim 22, further comprising a trigger configured to receive AC power from an AC power source or a power switch of the UPS system, wherein the AC power received at the trigger causes the trigger device to control the first switch.

24. The system of claim 1, wherein the dimmer is a pulse width modulation (PWM) dimmer.

25. The system of claim 13, further comprising a DC dimmer setting switch operated to preset a dimming level for a DC low voltage ranging between 0 and 9 volts.

26. The system of claim 13, wherein the low voltage dimming mode is 1-10v dimming mode, and a DC dimmer setting switch is provided that operates to preset a dimming level for a DC low voltage ranging between 1 and 10 volts.

27. The system of claim 17, wherein the LED load is dimmable by a low 1-10v voltage, and is further configured to: output a full power of the AC power source to the LED load when the AC power source is on; and output a full power of the AC power source and a DC low voltage to the LED load when the AC power source is interrupted.

28. The system of claim 17, wherein the LED load is dimmable by pulse width modulation.

\* \* \* \* \*

UNITED STATES PATENT AND TRADEMARK OFFICE
CERTIFICATE OF CORRECTION

PATENT NO. : 10,333,344 B2  
APPLICATION NO. : 15/437909  
DATED : June 25, 2019  
INVENTOR(S) : John F. Luk Page 1 of 1

It is certified that error appears in the above-identified patent and that said Letters Patent is hereby corrected as shown below:

In the Claims

In Line 34 of Column 19, please replace the text "a -10v dimming mode" recited in Claim 16 with the text "a 1-10v dimming mode".

Signed and Sealed this  
Eighteenth Day of February, 2020

Andrei Iancu  
*Director of the United States Patent and Trademark Office*